United States Patent
Bolla et al.

(10) Patent No.: US 12,455,730 B2
(45) Date of Patent: Oct. 28, 2025

(54) DEPLOYMENT CONTROL OVER CLOUD RESOURCES

(71) Applicant: Oracle International Corporation, Redwood Shores, CA (US)

(72) Inventors: Jason Bolla, Seattle, WA (US); Daniel M. Vogel, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 4 days.

(21) Appl. No.: 18/647,785

(22) Filed: Apr. 26, 2024

(65) Prior Publication Data

US 2024/0364590 A1 Oct. 31, 2024

Related U.S. Application Data

(60) Provisional application No. 63/462,875, filed on Apr. 28, 2023.

(51) Int. Cl.
*G06F 8/60* (2018.01)
*G06F 9/50* (2006.01)
(Continued)

(52) U.S. Cl.
CPC .............. *G06F 8/60* (2013.01); *G06F 9/5005* (2013.01); *H04L 9/3213* (2013.01);
(Continued)

(58) Field of Classification Search
None
See application file for complete search history.

(56) References Cited

U.S. PATENT DOCUMENTS

| 9,438,599 B1 | 9/2016 | Yuhan et al. |
| 10,878,483 B1 | 12/2020 | Felbinger et al. |

(Continued)

FOREIGN PATENT DOCUMENTS

| EP | 3429156 A1 | 1/2019 |
| EP | 3271857 B1 | 4/2020 |
| WO | 2021/150306 A1 | 7/2021 |

OTHER PUBLICATIONS

"Create a Reseller and Reseller Administrator User", Retrieved from https://abiquo.atlassian.net/wiki/spaces/ABI54/pages/310740667/Create+a+Reseller+and+Reseller+Administrator+User, May 3, 2022, pp. 1-5.

(Continued)

*Primary Examiner* — Quang N Nguyen
(74) *Attorney, Agent, or Firm* — Invoke

(57) ABSTRACT

Techniques for controlling resource deployments in a cloud partition of a cloud environment are disclosed. A cloud service provider (CSP) operates the cloud environment where its customers can specify two-tiered constraints on deployments to their respective partitions (i.e., regions or realms). A first deployment constraint may be a global constraint set by the CSP and a second deployment constraint may be a partition-specific deployment constraint set by a customer of the CSP. Each deployment constraint applies to the changes/updates that can be made to one or more specific partitions. A global deployment orchestrator conditions a deployment, at least in part, on whether the deployment satisfies the two-tiers of deployment constraint(s).

19 Claims, 12 Drawing Sheets

(51) Int. Cl.
*H04L 9/32* (2006.01)
*H04L 9/40* (2022.01)
*H04L 41/0806* (2022.01)
*H04L 41/0869* (2022.01)
*H04L 67/10* (2022.01)
*G06Q 30/015* (2023.01)

(52) U.S. Cl.
CPC ...... *H04L 41/0806* (2013.01); *H04L 41/0869* (2013.01); *H04L 63/108* (2013.01); *H04L 67/10* (2013.01); *G06Q 30/015* (2023.01)

(56) References Cited

U.S. PATENT DOCUMENTS

| | | | |
|---|---|---|---|
| 10,992,540 | B1* | 4/2021 | Kandaswamy ....... H04L 41/122 |
| 2013/0054426 | A1 | 2/2013 | Rowland et al. |
| 2014/0156846 | A1* | 6/2014 | Stern ....... H04L 69/40 709/226 |
| 2015/0363852 | A1 | 12/2015 | Vautour |
| 2016/0043909 | A1 | 2/2016 | Pogrebinsky et al. |
| 2016/0277411 | A1 | 9/2016 | Dani et al. |
| 2017/0230229 | A1 | 8/2017 | Sasturkar et al. |
| 2019/0087835 | A1 | 3/2019 | Schwed et al. |
| 2020/0112497 | A1 | 4/2020 | Yenumulapalli et al. |
| 2020/0236096 | A1* | 7/2020 | Zhu ......... H04L 67/60 |
| 2020/0285496 | A1* | 9/2020 | Cropper ............... G06F 8/60 |
| 2021/0216190 | A1 | 7/2021 | Vakil et al. |
| 2021/0234864 | A1 | 7/2021 | Dube et al. |
| 2021/0377272 | A1 | 12/2021 | Dasari et al. |
| 2022/0255902 | A1 | 8/2022 | Woodson |
| 2023/0032585 | A1* | 2/2023 | Jeuk ........ H04L 41/12 |
| 2024/0054063 | A1 | 2/2024 | Wichelman et al. |
| 2024/0095739 | A1 | 3/2024 | Adogla et al. |

OTHER PUBLICATIONS

"General Variables for All Requests", Jun. 28, 2023, pp. 6.
"Overview of Access Approval", Retrieved from https://cloud.google.com/assured-workloads/access-approval/docs/overview, Jun. 6, 2024, pp. 5.
"Periodic 802.1X reauthentication", Retrieved from https://techhub.hpe.com/eginfolib/networking/docs/switches/5130ei/5200-3946_security_cg/content/485048074.htm, Retrieved from Oct. 25, 2023, p. 1.
"Policy Syntax", Jan. 4, 2023, pp. 7.
"Reinstate admin privileges for a customer's Azure CSP subscriptions", Retrieved from https://learn.microsoft.com/en-us/partner-center/reinstate-csp, Aug. 1, 2023, pp. 7.
"Tenant administrator settings", Retrieved from https://backstage.forgerock.com/docs/idcloud/latest/tenants/tenant-administrator-settings.html, Jun. 7, 2023, pp. 12.
"Verbs", Jun. 5, 2023, pp. 2.
Anonymbus: "Tokenization—(data security)", Wikipedia, Feb. 12, 2023, pp. 1-12.
Bhat S., "Admin access management in Azure Cloud Solution Provider (CSP) subscriptions", Retrieved from https://techcommunity.microsoft.com/t5/security-compliance-and-identity/admin-access-management-in-azure-cloud-solution-provider-csp/ba-p/3947126, Nov. 21, 2023, pp. 8.
Ducharme et al., "Seamlessly Protect Your IBM Cloud Application Infrastructure with Privileged Access Gateway", Oct. 3, 2022, pp. 13.
George et al., "Data anonymization and integrity checking in cloud computing", 2013 Fourth International Conference on Computing, Communications and Networking Technologies (ICCCNT), Jul. 2013, pp. 5.
Ma et al., "ServiceRank: Root Cause Identification of Anomaly in Large-Scale Microservice Architectures", : IEEE Transactions on Dependable and Secure Computing, vol. 19, No. 5, Sep.-Oct. 2022, pp. 3087-3100.
Soldani et al., "Anomaly Detection and Failure Root Cause Analysis in (Micro)Service-Based Cloud Applications: A Survey", ACM Computing Surveys, vol. 55, No. 3, Article 59, Feb. 2022, pp. 1-39.

* cited by examiner

DEPLOYMENT CONTROL OVER CLOUD RESOURCES

TECHNICAL FIELD

Each of the following applications are hereby incorporated by reference: Application No. 63/462,875 filed on Apr. 28, 2023. The Applicant hereby rescinds any disclaimer of claim scope in the parent application(s) or the prosecution history thereof and advises the USPTO that the claims in this application may be broader than any claim in the parent application(s).

BACKGROUND

A cloud computing environment can be used to provide access to a range of complementary cloud-based components, such as software applications or services, that enable organizations or enterprise customers to operate their applications and services in a highly available hosted environment.

The benefits to an organization in moving their application and service needs to a cloud environment include a reduction in the cost and complexity of designing, building, operating, and maintaining their own on-premises data center, software application framework, or other information technology infrastructure.

Deploying resources in cloud environments can be complicated by specific customers' needs and preferences. For example, one customer may require uninterrupted uptime on the weekends, while another customer may require uninterrupted uptime on weekdays. Alternatively or additionally, different customers may have different security and/or compliance needs that affect when, how, and/or by whom resources can be deployed. In general, in a cloud environment, a deployment schedule that is appropriate for one customer may not be appropriate for another customer. However, customers typically do not have any control over when resources are deployed to the customers' respective partitions of the cloud environment.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
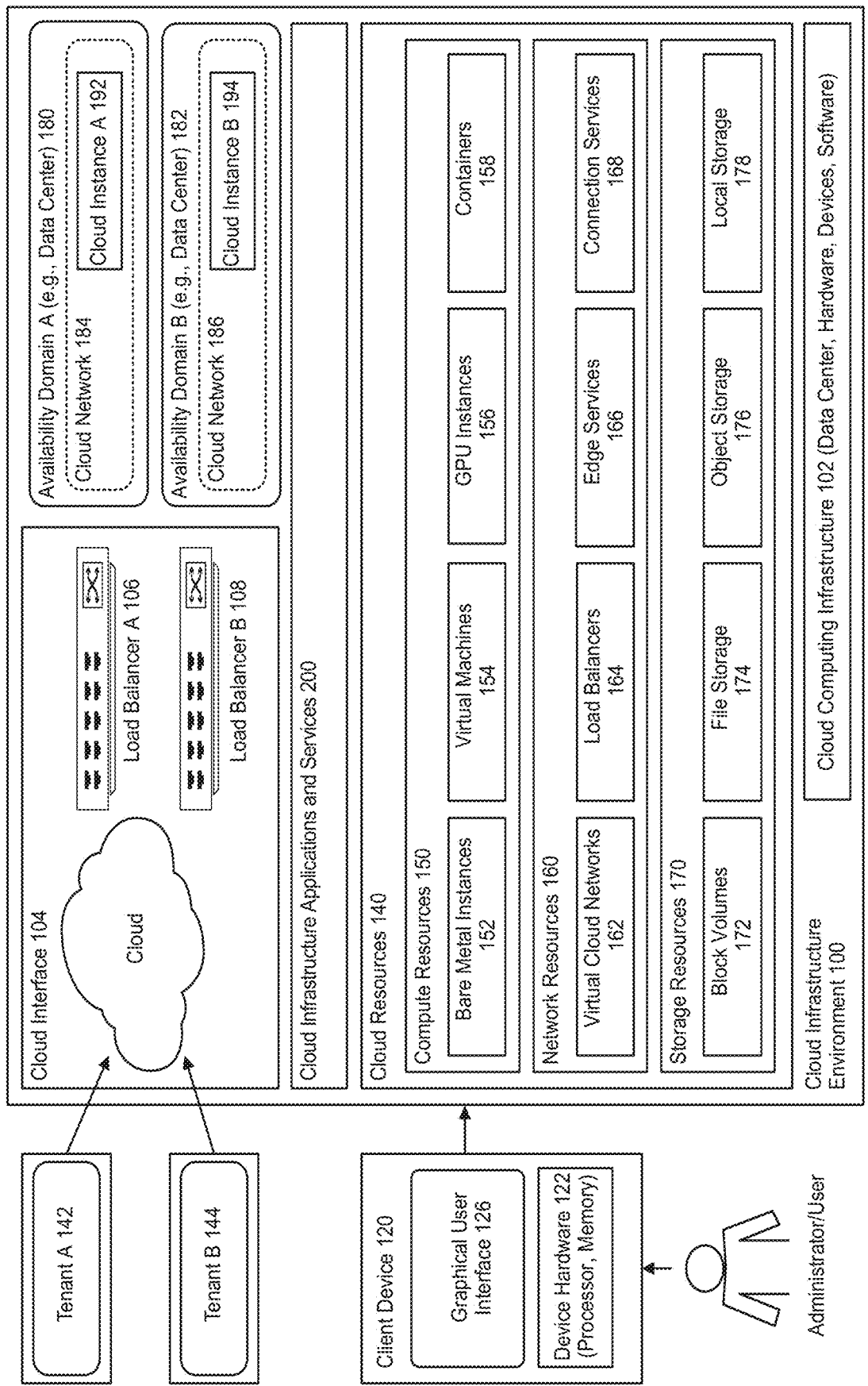
FIG. 1 illustrates a system for providing a cloud infrastructure environment in accordance with an embodiment.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. DEDICATED OR PRIVATE LABEL CLOUD ENVIRONMENTS
3. DEPLOYMENT ORCHESTRATION CLOUD SYSTEM
4. CONTROLLING DEPLOYMENT OF CLOUD RESOURCES
5. EXAMPLE EMBODIMENT
6. MISCELLANEOUS; EXTENSIONS

1. GENERAL OVERVIEW

A Cloud Service Provider (CSP) operates a cloud environment where a number of tenants share a set of cloud partitions. One or more embodiments transmit, to a first cloud partition in a plurality of cloud partitions, a deployment request to deploy a resource to the first cloud partition. Responsive to receiving, from the first cloud partition, a message indicating approval of the deployment request, one or more embodiments deploy the resource to the first cloud partition. The approval of the deployment request may be conditioned on evaluating the deployment request against a state of the cloud environment. A tenant for the first cloud partition can manage resource deployments to their respective partition by dynamically evaluating deployment requests against partition-specific state information (e.g., and against partition-specific deployment constraints).

The system may transmit the first deployment request to multiple cloud partitions including the first cloud partition and a second cloud partition. In this manner, the system can request deployment of the same resource (or same resource version) to the first cloud partition and at least the second cloud partition. Based on state information for the second cloud partition, one or more embodiments receive, from the second cloud partition, a message indicating a denial of the deployment request. Responsive to receiving the denial, one or more embodiments refrain from deploying the resource in the second cloud partition. The denial of the deployment request may be conditioned on evaluating the deployment request against a state of the cloud environment. Similar to the tenant for the first cloud partition, a tenant for the second cloud partition can manage resource deployments to their respective partition by dynamically evaluating the deployment request against state information (e.g., and against partition-specific deployment constraints)

Instead of static rules controlling deployments of any updates/changes to a tenant's cloud partition (e.g., a specific region in a realm), one or more embodiments enable tenant-defined rules (herein referred to as partition-specific deployment constraints) for the CSP to follow before the CSP can execute any resource deployment. Given that an entity managing the tenant's cloud partition is not the same entity deploying updates/changes to the tenant's cloud partition, implementing the deployment constraints provides the tenant with a level of control over those updates/changes. Although the partition-specific deployment constraints afford the tenant a certain level of control over the deployments in their cloud partition, the one or more embodiments can balance that level of control with CSP-defined rules (herein referred to as global deployment constraints). The one or more embodiments can determine that a deployment request satisfies one or more global deployment before transmitting that deployment request to the tenant's cloud partition.

One or more embodiments described in this Specification and/or recited in the claims may not be included in this General Overview section.

2. DEDICATED OR PRIVATE LABEL CLOUD ENVIRONMENTS

One or more embodiments provide features associated with dedicated or private label cloud (PLC) environments for use by tenants of a cloud infrastructure environment in accessing software products, services, or other offerings associated with the environment.

A cloud computing or cloud infrastructure environment can be used to provide access to a range of complementary cloud-based components, such as software applications or services, that enable organizations or enterprise customers to operate their applications and services in a highly available hosted environment.

The benefits to an organization in moving their application and service needs to a cloud infrastructure environment include a reduction in the cost and complexity of designing, building, operating, and maintaining their own on-premises data center, software application framework, or other information technology infrastructure.

Cloud Infrastructure Environments

Figure 2:
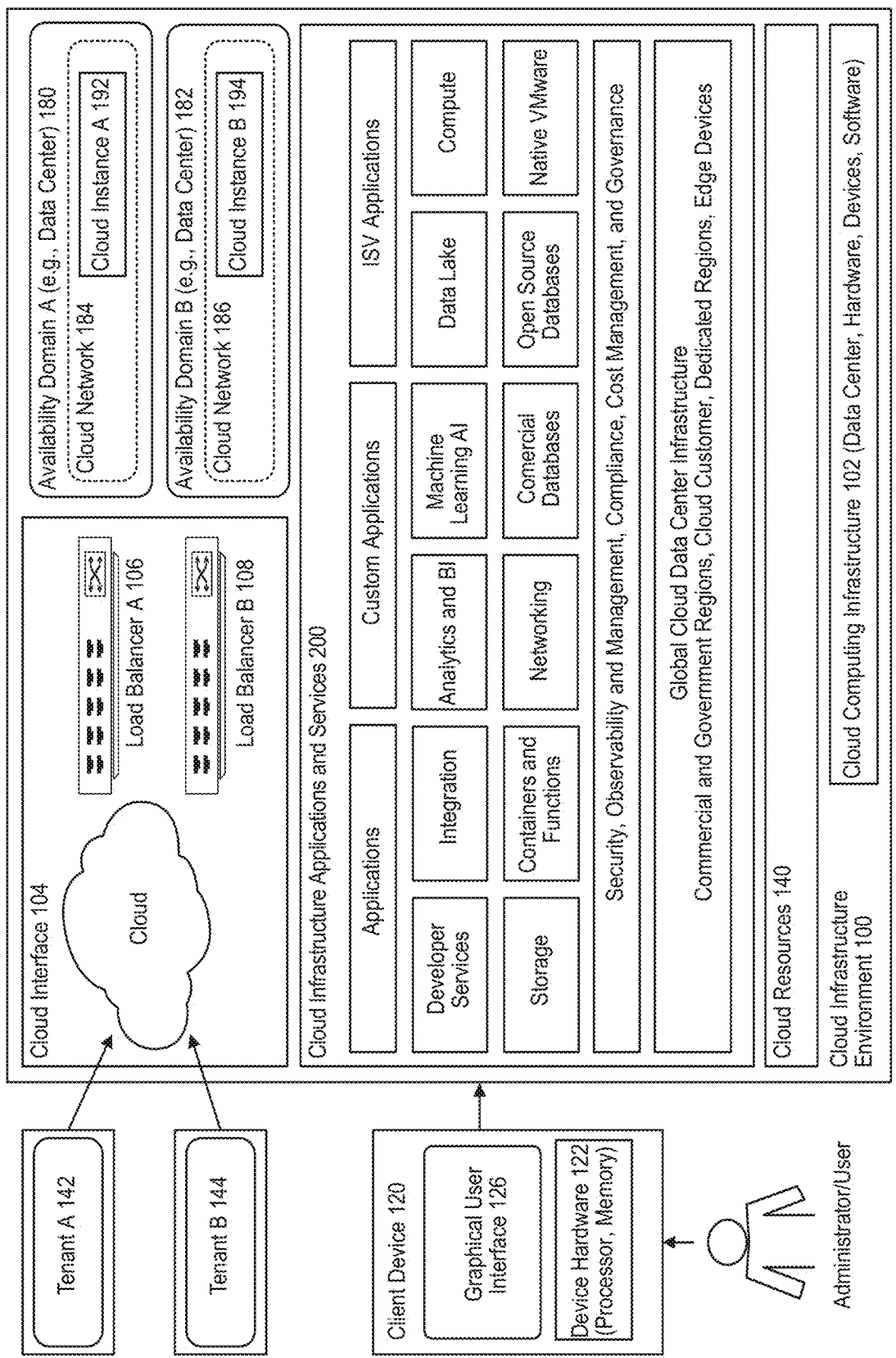
FIG. 2 further illustrates how a cloud infrastructure environment can be used to provide cloud-based applications or services or services in accordance with an embodiment.

FIGS. 1 and 2 illustrate a system for providing a cloud infrastructure environment in accordance with an embodiment.

In accordance with an embodiment, the components and processes illustrated in FIG. 1, and as further described herein regarding various embodiments, can be provided as software or program code executable by a computer system or other type of processing device, for example, a cloud computing system.

The illustrated example is provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

As illustrated in FIG. 1, in accordance with an embodiment, a cloud infrastructure environment 100 can operate on a cloud computing infrastructure 102 comprising hardware (e.g., processor, memory), software resources, and one or more cloud interfaces 104 or other application program interfaces (API) that provide access to the shared cloud resources via one or more load balancers A 106, B 108. Cloud interface 102 includes user interfaces and APIs provided by a cloud services provider for interacting with its cloud services. This includes tools and platforms that allow users and administrators to manage, configure, and monitor cloud resources and services. Cloud interface 102 may include a console, such as a web-based user interface that provides a visual way to interact with and manage cloud resources. Through the console, users may, for example, create, configure, and monitor cloud services like compute instances, databases, storage, and networking components. Cloud interface 102 may also include a command line interface for users who prefer to work with the cloud infrastructure using command-line tools. The CLI allows for scripting and automation of cloud management tasks in an embodiment.

In accordance with an embodiment, load balancer A 106 and load balancer B 108 are services that distribute incoming network traffic across multiple servers, instances, or other resources to ensure that no single resource bears too much demand. By spreading the requests evenly across the resources, load balancers enhance the responsiveness and availability of resources such as applications, websites, or databases. Load balancer A 106 and load balancer B 108 may be either public load balancers that are accessible from the Internet and used for distributing external traffic, or private load balancers that are used within a virtual cloud network (VCN) and are not accessible from the public Internet (and are therefore ideal for internal traffic distribution). In an embodiment, load balancer A 106 and load balancer B 108 are designed for high availability and fault tolerance and are implemented in a redundant configuration across multiple availability domains or fault domains.

In accordance with an embodiment, the cloud infrastructure environment supports the use of availability domains, such as availability domain A 180 and availability domain B 182, that enable customers to create and access cloud networks 184, 186, and run cloud instances A 192, B 194. In an embodiment, availability A 180 and availability domain B 182 may represent a data center, or a set of data centers located within a region. These availability domains may be isolated from each other, meaning that they may not share the same physical infrastructure such as power or cooling systems. This design provides a high degree of failure independence and robustness. In an embodiment, a fault domain may provide additional protection and resiliency within a single availability domain by grouping hardware and infrastructure within an availability domain that is isolated from other fault domains. This isolation may be in terms of electricity, cooling, and other potential sources of failure.

In accordance with an embodiment, a tenancy (a container for resources used by a tenant) can be created for each cloud tenant/customer, for example, tenant A 142, B 144, that provides a secure and isolated partition within the cloud infrastructure environment where the customer can create, organize, and administer their cloud resources. A cloud tenant/customer can access an availability domain and a cloud network to access each of their cloud instances. A tenancy in is isolated from other tenancies, ensuring that each customer's data and resources are secure and inaccessible to others. Within a tenancy, customers can create, manage, and organize a wide range of cloud resources, including compute instances, storage volumes, and networks. In Identity and Access Management (IAM) service enables the management of users, groups, and policies within a tenancy. Through IAM, customers can control who has access to their resources and what actions they can perform. The tenancy is also the level where billing and subscription management are handled. Usage and costs associated with the resources within a tenancy are tracked and billed collectively under that tenancy. Each tenancy may be associated with specific service limits and quotas for various resources. These limits may be used to help manage capacity and facilitate resource distribution across each tenant.

In accordance with an embodiment, a computing device, such as a client device 120 having a device hardware 122 (e.g., processor, memory) and graphical user interface 126, can enable an administrator or other user to communicate with the cloud infrastructure environment via a network, such as a wide area network, a local area network, or the Internet, to create or update cloud services.

In accordance with an embodiment, the cloud infrastructure environment provides access to shared cloud resources 140 via, for example, a compute resources layer 150, a network resources layer 160, and/or a storage resources layer 170. Customers can launch cloud instances as needed to meet compute and application requirements. After a customer provisions and launches a cloud instance, the provisioned cloud instance can be accessed from a client device such as client device 120.

In accordance with an embodiment, compute resources 150 can comprise resources, such as bare metal cloud instances 152, virtual machines 154, graphical processing unit (GPU) compute cloud instances 156, and/or containers 158. A bare metal instance represents a physical server with dedicated hardware that is fully allocated to a single tenant. A bare metal instance provides direct access to the server's processor, memory, storage, and other hardware resources. A virtual machine (VM) is a software emulation of a physical computer that runs an operating system and applications like a physical computer. VMs allow multiple operating systems to run on a single physical machine or across multiple machines. A hypervisor layer resides between the hardware and the virtual machines, allocating physical resources (like CPU, memory, and storage) to each VM. In an embodiment, GPU compute cloud instances provide GPUs along with traditional CPU resources. These instances are designed for tasks that require significant parallel processing power, making them ideal for applications like machine learning, scientific computing, 3D rendering, and video processing. In an embodiment, Containers 158 use a method of virtualization that allows for the running of multiple isolated applications on a single control host, virtualizing the operating system. Each container shares the host system's kernel but runs in an isolated user space, making containers lightweight and efficient.

The components of the compute resources 150 can be used to provision and manage bare metal compute cloud instances or provision cloud instances as needed to deploy and run applications, as in an on-premises data center. For example, in accordance with an embodiment, the cloud infrastructure environment can provide control of physical host (bare metal) machines within the compute resources layer that run as compute cloud instances directly on bare metal servers without a hypervisor.

In accordance with an embodiment, the cloud infrastructure environment can also provide control of virtual machines within the compute resources layer that can be launched, for example, from an image, wherein the types and quantities of resources available to a virtual machine cloud instance can be determined, for example, based upon the image that the virtual machine was launched from.

In accordance with an embodiment, the network resources layer can comprise several network-related resources, such as virtual cloud networks (VCNs) 162, load balancers 164, edge services 166, and/or connection services 168. In an embodiment, a virtual cloud network (VCN) is a customizable and private network in a cloud environment. A VCN provides a virtual version of a traditional network, including subnets, route tables, and gateways. It allows users to set up their cloud-based network architecture according to their requirements. In an embodiment, edge services 166 include services and technologies designed to bring computation, data storage, and networking capabilities closer to the location where they are needed. Edge services 166 may be used to optimize traffic, reduce latency, or provide other advantages.

In accordance with an embodiment, the storage resources layer can comprise several resources, such as data/block volumes 172, file storage 174, object storage 176, and/or local storage 178. Data/block volumes 172 provide unformatted block-level storage that can be used to create file systems that host databases or for other purposes requiring unformatted storage. File storage 174 provides a file system in an embodiment and may offer shared file systems that multiple instances can access concurrently using standard file storage protocols. Object storage 176 manages data as objects within storage buckets. Objects have certain attributes that may include data, metadata, and a unique identifier. Local storage 178 refers to storage devices that are physically attached to the host computer.

As illustrated in FIG. 2, in accordance with an embodiment, the cloud infrastructure environment can include a range of complementary cloud-based components, such as cloud infrastructure applications and services 200, that enable organizations or enterprise customers to operate their applications and services in a highly available hosted environment.

In accordance with an embodiment, a self-contained cloud region can be provided as a complete, e.g., Oracle Cloud Infrastructure (OCI), dedicated region within an organization's data center that offers the data center operator the agility, scalability, and economics of an e.g., OCI public cloud, while retaining full control of their data and applications to meet security, regulatory, or data residency requirements.

For example, in accordance with an embodiment, such an environment can include racks physically and logically managed by a cloud infrastructure provider (e.g., Oracle), customer's racks, access for cloud operations personnel for setup and hardware support, customer's data center power and cooling, customer's floor space, an area for customer's data center personnel, and a physical access cage.

In accordance with an embodiment, a dedicated region offers to a tenant/customer the same set of infrastructure-as-a-service (IaaS), platform-as-a-service (PaaS), and software-as-a-service (SaaS) products or services available in the cloud infrastructure provider's (e.g., Oracle's) public cloud regions, for example, ERP, Financials, HCM, and SCM. A customer can seamlessly lift and shift legacy workloads using the cloud infrastructure provider's services (e.g., bare metal compute, VMs, and GPUs), database services (e.g., Oracle Autonomous Database), or container-based services (e.g., Oracle Container Engine for Kubernetes).

In accordance with an embodiment, a cloud infrastructure environment can operate according to an infrastructure-as-a-service (IaaS) model that enables the environment to provide virtualized computing resources over a public network (e.g., the Internet)

In an IaaS model, a cloud infrastructure provider can host the infrastructure components (e.g., servers, storage devices, network nodes (e.g., hardware), deployment software, platform virtualization (e.g., a hypervisor layer), or the like). In some cases, a cloud infrastructure provider may also supply a variety of services to accompany those infrastructure components; example services include billing software, monitoring software, logging software, load balancing software, or clustering software. Thus, as these services may be policy-driven, IaaS users may be able to implement policies to drive load balancing to maintain application availability and performance.

In accordance with an embodiment, IaaS customers may access resources and services through a wide area network (WAN), such as the Internet, and can use the cloud infrastructure provider's services to install the remaining elements of an application stack. For example, the user can log in to the IaaS platform to create virtual machines (VMs), install operating systems (OSs) on each VM, deploy middleware such as databases, create storage buckets for workloads and backups, and install enterprise software into that VM. Customers can then use the provider's services to perform various functions, including balancing network traffic, troubleshooting application issues, monitoring performance, or managing disaster recovery.

In accordance with an embodiment, a cloud infrastructure provider may, but need not, be a third-party service that specializes in providing (e.g., offering, renting, selling) IaaS. An entity might also opt to deploy a private cloud, becoming its own provider of infrastructure services.

In accordance with an embodiment, IaaS deployment is the process of putting a new application, or a new version of an application, onto a prepared application server or the like. It may also include the process of preparing the server (e.g., installing libraries or daemons). This is often managed by the cloud infrastructure provider below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like).

In accordance with an embodiment, IaaS provisioning may refer to acquiring computers or virtual hosts for use and installing needed libraries or services on them. In most cases, deployment does not include provisioning, and the provisioning may need to be performed first.

In accordance with an embodiment, challenges for IaaS provisioning include the initial challenge of provisioning the initial set of infrastructure before anything is running. Second, there is the challenge of evolving the existing infrastructure (e.g., adding new services, changing services, or removing services) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on others, and how they each work together) can be described declaratively. In some instances, once the topology is defined, a workflow can be generated that creates and/or manages the different components described in the configuration files.

In accordance with an embodiment, a cloud infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up for one or more virtual machines (VMs). Other infrastructure elements may also be provisioned, such as a load balancer, a database, or the like. As more infrastructure elements are desired and/or added, the infrastructure may incrementally evolve.

In accordance with an embodiment, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various geographic locations). However, in some examples, the infrastructure where the code will be deployed requires provisioning. In some instances, the provisioning can be done manually, a provisioning tool may be utilized to provision the resources, and/or deployment tools may be utilized to deploy the code once the infrastructure is provisioned.

Figure 3:
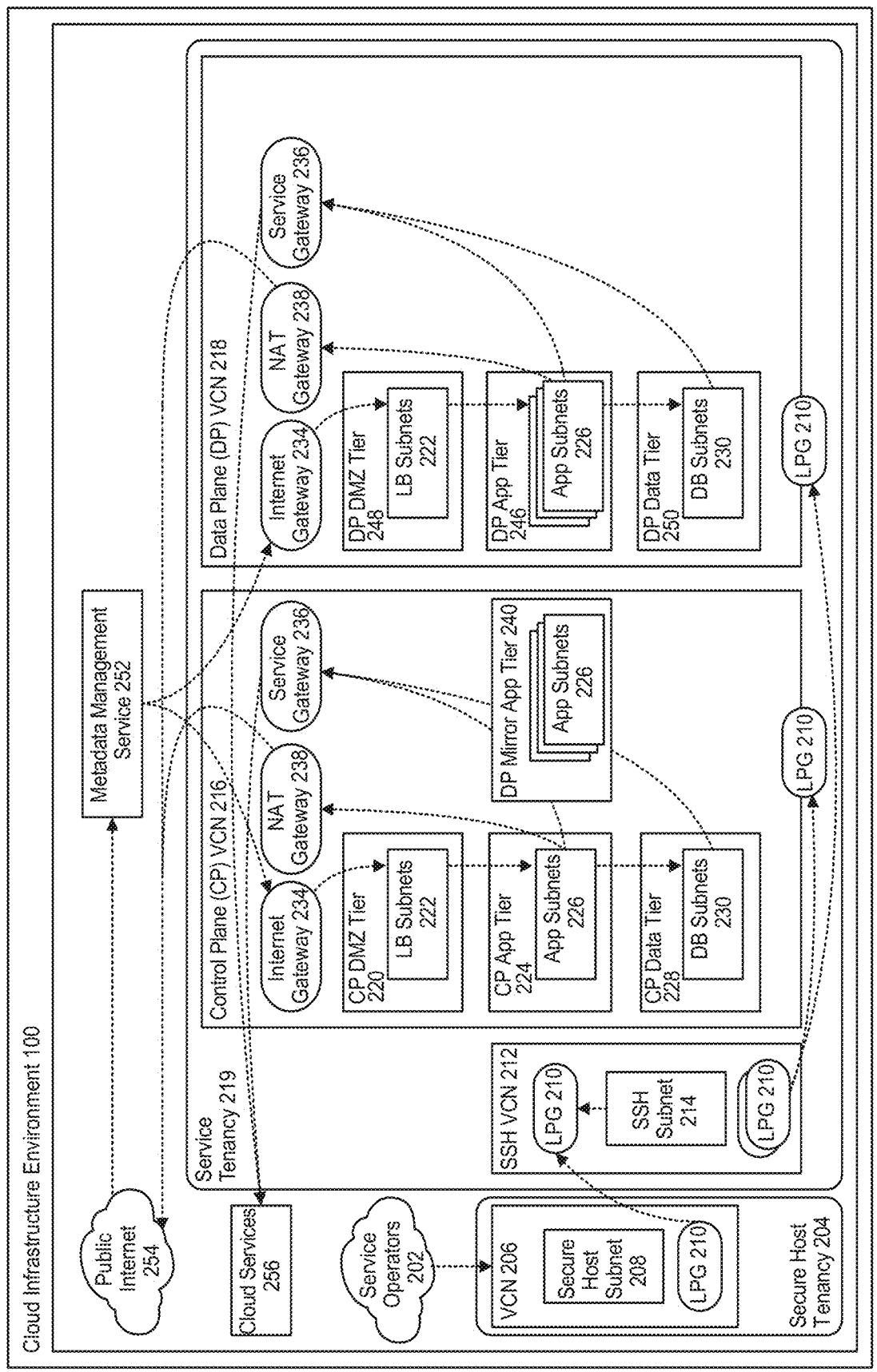
FIG. 3 illustrates an example cloud infrastructure architecture in accordance with an embodiment.

FIG. 3 illustrates an example cloud infrastructure architecture in accordance with an embodiment.

As illustrated in FIG. 3, in accordance with an embodiment, service operators 202 can be communicatively coupled to a secure host tenancy 204 that can include a virtual cloud network (VCN) 206 and a secure host subnet 208.

In some examples, the service operators may be using one or more client computing devices that may be portable handheld devices (e.g., a telephone, a computing tablet, a personal digital assistant (PDA)) or wearable devices (e.g., a head mounted display), running software such as Microsoft Windows, and/or a variety of mobile operating systems, such as iOS, Android, and the like, and being Internet, e-mail, short message service (SMS), or other communication protocol enabled. Alternatively, the client computing devices can be general purpose personal computers including, for example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including without limitation the variety of GNU/Linux operating systems such as Chrome OS. Additionally, or alternatively, client computing devices may be any other electronic device, such as a thin-client computer, an Internet-enabled gaming system (e.g., a Microsoft Xbox gaming console), and/or a personal messaging device, capable of communicating over a network that can access the VCN and/or the Internet.

In accordance with an embodiment, a VCN can include a local peering gateway (LPG) 210 that can be communicatively coupled to a secure shell (SSH) VCN 212 via an LPG contained in the SSH VCN. The SSH VCN can include an SSH subnet 214, and the SSH VCN can be communicatively coupled to a control plane VCN 216 via the LPG contained in the control plane VCN. Also, the SSH VCN can be communicatively coupled to a data plane VCN 218 via an LPG. The control plane VCN and the data plane VCN can be contained in a service tenancy 219 that can be owned and/or operated by the cloud infrastructure provider.

In accordance with an embodiment, a control plane VCN can include a control plane demilitarized zone (DMZ) tier 220 that acts as a perimeter network (e.g., portions of a corporate network between the corporate intranet and external networks). The DMZ-based servers may have restricted responsibilities that help contain potential breaches. Additionally, the DMZ tier can include one or more load balancer (LB) subnets 222, a control plane app tier 224 that can include app subnets 226, and a control plane data tier 228 that can include database (DB) subnets 230 (e.g., frontend DB subnet(s) and/or backend DB subnet(s)). The LB subnet(s) contained in the control plane DMZ tier can be communicatively coupled to the app subnet(s) contained in the control plane app tier and to an Internet gateway 234 that can be contained in the control plane VCN. The app subnet(s) can be communicatively coupled to the DB subnet(s) contained in the control plane data tier, a service gateway 236, and a network address translation (NAT) gateway 238. The control plane VCN can include the service gateway and the NAT gateway.

In accordance with an embodiment, the control plane VCN can include a data plane mirror app tier 240 that can include app subnet(s). The app subnet(s) contained in the data plane mirror app tier can include a virtual network interface controller (VNIC) that can execute a compute instance. The compute instance can communicatively couple the app subnet(s) of the data plane mirror app tier to app subnet(s) that can be contained in a data plane app tier.

In accordance with an embodiment, the data plane VCN can include the data plane app tier, a data plane DMZ tier, and a data plane data tier. The data plane DMZ tier can include LB subnet(s) that can be communicatively coupled to the app subnet(s) of the data plane app tier and the Internet gateway of the data plane VCN. The app subnet(s) can be communicatively coupled to the service gateway of the data plane VCN and the NAT gateway of the data plane VCN. The data plane data tier can also include the DB subnet(s) that can be communicatively coupled to the app subnet(s) of the data plane app tier.

In accordance with an embodiment, the Internet gateway of the control plane VCN and of the data plane VCN can be communicatively coupled to a metadata management service 252 that can be communicatively coupled to the public Internet 254. The public Internet can be communicatively coupled to the NAT gateway of the control plane VCN and of the data plane VCN. The service gateway of the control plane VCN and of the data plane VCN can be communicatively coupled to cloud services 256.

In accordance with an embodiment, the service gateway of the control plane VCN, or of the data plane VCN, can make application programming interface (API) calls to cloud services without going through the public Internet. The API calls to cloud services from the service gateway can be one-way; the service gateway can make API calls to cloud services, and cloud services can send requested data to the service gateway. Generally, cloud services may not initiate API calls to the service gateway.

In accordance with an embodiment, the secure host tenancy can be directly connected to the service tenancy that may be otherwise isolated. The secure host subnet can communicate with the SSH subnet through an LPG that may enable two-way communication over an otherwise isolated system. Connecting the secure host subnet to the SSH subnet may give the secure host subnet access to other entities within the service tenancy.

In accordance with an embodiment, the control plane VCN may allow users of the service tenancy to set up or otherwise provision desired resources. Desired resources provisioned in the control plane VCN may be deployed or otherwise used in the data plane VCN. In some examples, the control plane VCN can be isolated from the data plane VCN, and the data plane mirror app tier of the control plane VCN can communicate with the data plane app tier of the data plane VCN via VNICs that can be contained in the data plane mirror app tier and the data plane app tier.

In accordance with an embodiment, users of the system, or customers, can make requests, for example, create, read, update, or delete (CRUD) operations through the public Internet that can communicate the requests to the metadata management service. The metadata management service can communicate the request to the control plane VCN through the Internet gateway. The request can be received by the LB subnet(s) contained in the control plane DMZ tier. The LB subnet(s) may determine that the request is valid, and in response to this determination, the LB subnet(s) can transmit the request to app subnet(s) contained in the control plane app tier. If the request is validated and requires a call to the public Internet, the call to the Internet may be transmitted to the NAT gateway that can make the call to the Internet. Metadata to be stored by the request can be stored in the DB subnet(s).

In accordance with an embodiment, the data plane mirror app tier can facilitate direct communication between the control plane VCN and the data plane VCN. For example, changes, updates, or other suitable modifications to configuration may be desired to be applied to the resources contained in the data plane VCN. By means of a VNIC, the control plane VCN can directly communicate with, and can thereby execute the changes, updates, or other suitable modifications to configuration to, resources contained in the data plane VCN.

In accordance with an embodiment, the control plane VCN and the data plane VCN can be contained in the service tenancy. In this case, the user, or the customer, of the system may not own or operate either the control plane VCN or the data plane VCN. Instead, the cloud infrastructure provider may own or operate the control plane VCN and the data plane VCN, both that may be contained in the service tenancy. This embodiment can enable isolation of networks that may prevent users or customers from interacting with the resources of other users or other customers. Also, this embodiment may allow users or customers of the system to store databases privately without needing to rely on the public Internet for storage that may not provide a desired level of threat prevention.

In accordance with an embodiment, the LB subnet(s) contained in the control plane VCN can be configured to receive a signal from the service gateway. In this embodiment, the control plane VCN and the data plane VCN may be configured to be called by a customer of the cloud infrastructure provider without calling the public Internet. Customers of the cloud infrastructure provider may desire this embodiment since the database(s) that the customers use may be controlled by the cloud infrastructure provider and may be stored on the service tenancy that may be isolated from the public Internet.

Figure 4:
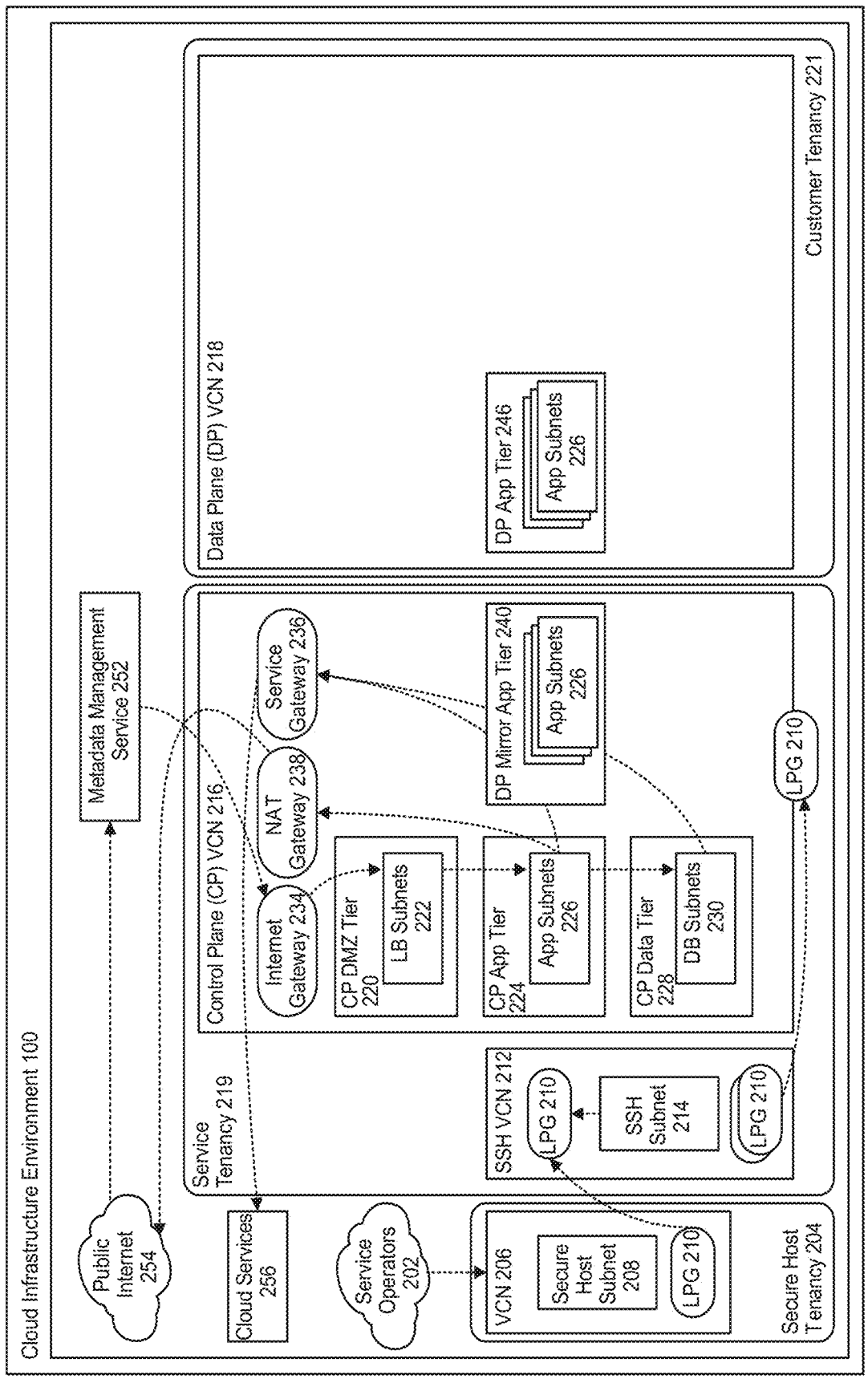
FIG. 4 illustrates another example of a cloud infrastructure architecture in accordance with an embodiment.

FIG. 4 illustrates another example of a cloud infrastructure architecture in accordance with an embodiment.

As illustrated in FIG. 4, in accordance with an embodiment, the data plane VCN can be contained in the customer tenancy 221. In this case, the cloud infrastructure provider may provide the control plane VCN for each customer, and the cloud infrastructure provider may, for each customer, set up a unique compute instance that is contained in the service tenancy. Each compute instance may allow communication between the control plane VCN, contained in the service tenancy, and the data plane VCN that is contained in the customer tenancy. The compute instance may allow resources provisioned in the control plane VCN contained in the service tenancy to be deployed or otherwise used in the data plane VCN contained in the customer tenancy.

In accordance with an embodiment, a customer of the cloud infrastructure provider may have databases that are managed and operated within the customer tenancy. In this example, the control plane VCN can include the data plane mirror app tier that can include app subnet(s). The data plane mirror app tier can reside in the data plane VCN, but the data plane mirror app tier may not be provided in the data plane VCN. That is, the data plane mirror app tier may have access to the customer tenancy, but the data plane mirror app tier may not exist in the data plane VCN or be owned or operated by the customer. The data plane mirror app tier may be configured to make calls to the data plane VCN, but the data plane mirror app tier may not be configured to make calls to any entity contained in the control plane VCN. The customer may desire to deploy or otherwise use resources in the data plane VCN that are provisioned in the control plane VCN, and the data plane mirror app tier can facilitate the desired deployment, or other usage of resources, by the customer.

In accordance with an embodiment, a customer of the cloud infrastructure provider can apply filters to the data plane VCN. In this embodiment, the customer can determine what the data plane VCN can access, and the customer may restrict access to the public Internet from the data plane VCN. The cloud infrastructure provider may not be able to apply filters or otherwise control access of the data plane VCN to any outside networks or databases. Applying filters and controls by the customer onto the data plane VCN, contained in the customer tenancy, can help isolate the data plane VCN from other customers and from the public Internet.

In accordance with an embodiment, cloud services can be called by the service gateway to access services that may not exist on the public Internet, on the control plane VCN, or on the data plane VCN. The connection between cloud services and the control plane VCN or the data plane VCN may not be continuous. Cloud services may exist on a different network owned or operated by the cloud infrastructure provider. Cloud services may be configured to receive calls from the service gateway and may be configured to not receive calls from the public Internet. Some cloud services may be isolated from other cloud services, and the control plane VCN may be isolated from cloud services that may not be in the same region as the control plane VCN.

For example, in accordance with an embodiment, the control plane VCN may be located in a "Region 1," and a cloud service "Deployment 1," may be located in Region 1 and in "Region 2." If a call to Deployment 1 is made by the service gateway contained in the control plane VCN located in Region 1, the call may be transmitted to Deployment 1 in Region 1. In this example, the control plane VCN, or Deployment 1 in Region 1, may not be communicatively coupled to, or otherwise in communication with, Deployment 1 in Region 2.

Figure 5:
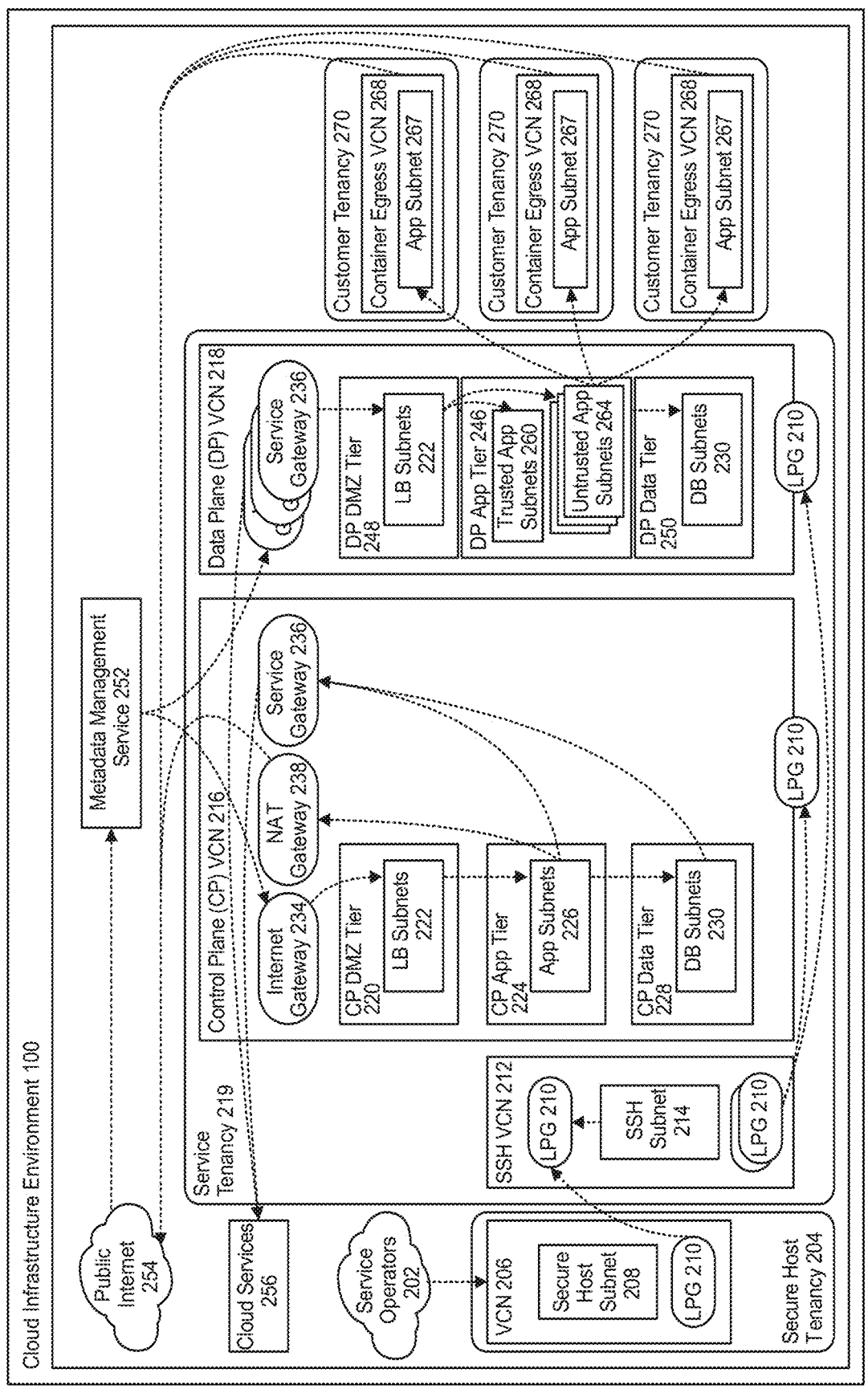
FIG. 5 illustrates another example of a cloud infrastructure architecture in accordance with an embodiment.

FIG. 5 illustrates another example of a cloud infrastructure architecture in accordance with an embodiment.

As illustrated in FIG. 5, in accordance with an embodiment, the trusted app subnets 260 can be communicatively coupled to the service gateway contained in the data plane VCN, the NAT gateway contained in the data plane VCN, and DB subnet(s) contained in the data plane data tier. The untrusted app subnets 264 can be communicatively coupled to the service gateway contained in the data plane VCN and DB subnet(s) contained in the data plane data tier. The data plane data tier can include DB subnet(s) that can be communicatively coupled to the service gateway contained in the data plane VCN.

In accordance with an embodiment, untrusted app subnet(s) can include one or more primary VNICs (1)-(N) that can be communicatively coupled to tenant virtual machines (VMs). Each tenant VM can be communicatively coupled to a respective app subnet 267 (1)-(N) that can be contained in respective container egress VCNs 268 (1)-(N) that can be contained in respective customer tenancies 270 (1)-(N). Respective secondary VNICs can facilitate communication between the untrusted app subnet(s) contained in the data plane VCN and the app subnet contained in the container egress VCN. Each container egress VCN can include a NAT gateway that can be communicatively coupled to the public Internet.

In accordance with an embodiment, the public Internet can be communicatively coupled to the NAT gateway contained in the control plane VCN and contained in the data plane VCN. The service gateway contained in the control plane VCN and contained in the data plane VCN can be communicatively coupled to cloud services.

In accordance with an embodiment, the data plane VCN can be integrated with customer tenancies. This integration can be useful or desirable for customers of the cloud infrastructure provider in cases that may require additional support when executing code. For example, the customer may provide code to run that may be potentially destructive, may communicate with other customer resources, or may otherwise cause undesirable effects.

In accordance with an embodiment, a customer of the cloud infrastructure provider may grant temporary network access to the cloud infrastructure provider and request a function to be attached to the data plane app tier. Code to run the function may be executed in the VMs and may not be configured to run anywhere else on the data plane VCN. Each VM may be connected to one customer tenancy. Respective containers (1)-(N) contained in the VMs may be configured to run the code. In this case, there can be a dual isolation (e.g., the containers running code, where the containers may be contained in at least the VM that are contained in the untrusted app subnet(s)) that may help prevent incorrect or otherwise undesirable code from damaging the network of the cloud infrastructure provider or from damaging a network of a different customer. The containers may be communicatively coupled to the customer tenancy and may be configured to transmit or receive data from the customer tenancy. The containers may not be configured to transmit or receive data from any other entity in the data plane VCN. Upon completion of running the code, the cloud infrastructure provider may dispose of the containers.

In accordance with an embodiment, the trusted app subnet(s) may run code that may be owned or operated by the cloud infrastructure provider. In this embodiment, the trusted app subnet(s) may be communicatively coupled to the DB subnet(s) and be configured to execute CRUD operations in the DB subnet(s). The untrusted app subnet(s) may be communicatively coupled to the DB subnet(s) and configured to execute read operations in the DB subnet(s). The containers that can be contained in the VM of each customer and that may run code from the customer may not be communicatively coupled with the DB subnet(s).

In accordance with an embodiment, the control plane VCN and the data plane VCN may not be directly communicatively coupled, or there may be no direct communication between the control plane VCN and the data plane VCN. However, communication can occur indirectly, wherein an LPG may be established by the cloud infrastructure provider that can facilitate communication between the control plane VCN and the data plane VCN. In another example, the control plane VCN or the data plane VCN can make a call to cloud services via the service gateway. For example, a call to cloud services from the control plane VCN can include a request for a service that can communicate with the data plane VCN.

Figure 6:
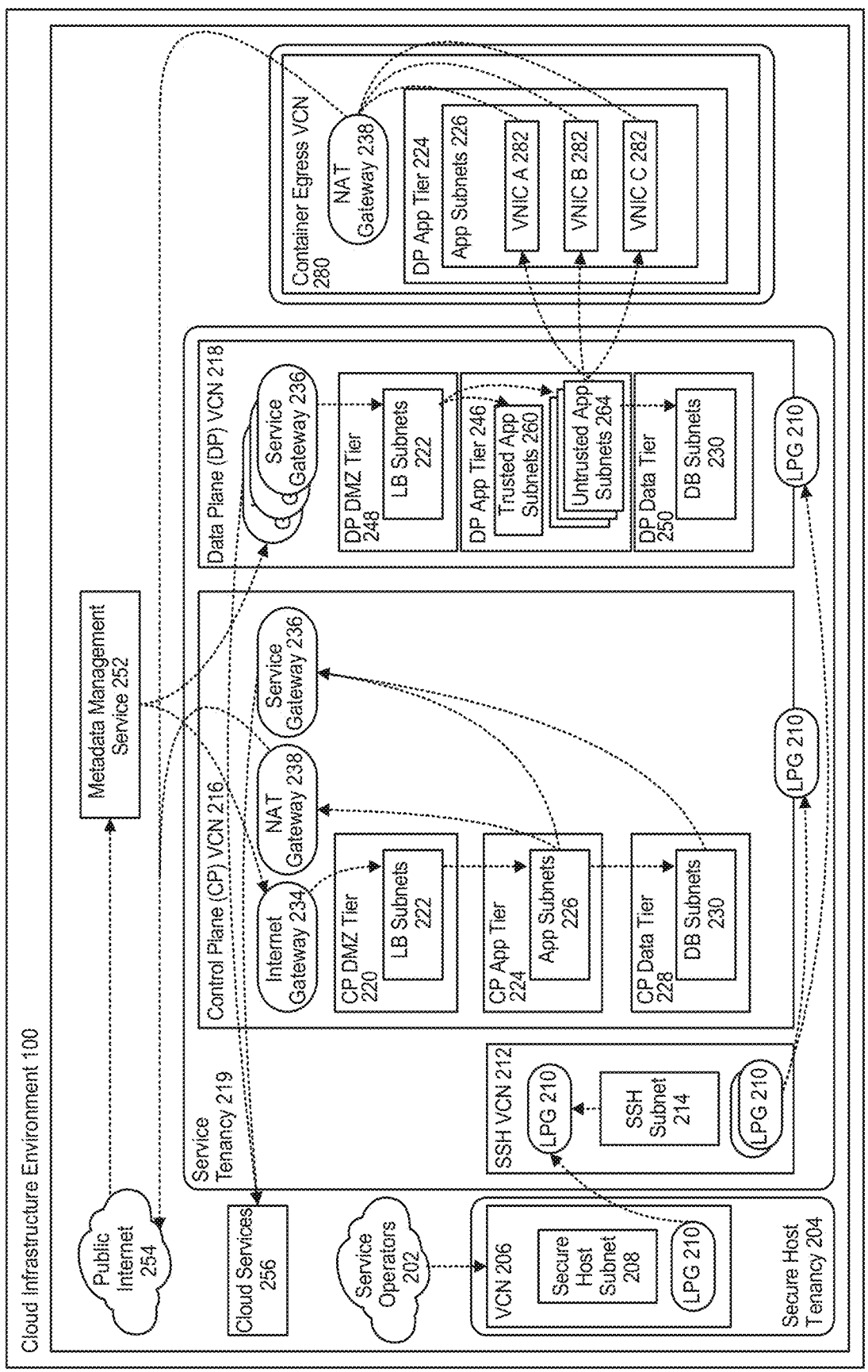
FIG. 6 illustrates another example of a cloud infrastructure architecture in accordance with an embodiment.

FIG. 6 illustrates another example of a cloud infrastructure architecture in accordance with an embodiment.

As illustrated in FIG. 6, in accordance with an embodiment, the trusted app subnet(s) can be communicatively coupled to the service gateway contained in the data plane VCN, the NAT gateway contained in the data plane VCN, and DB subnet(s) contained in the data plane data tier. The untrusted app subnet(s) can be communicatively coupled to the service gateway contained in the data plane VCN and DB subnet(s) contained in the data plane data tier. The data plane data tier can include DB subnet(s) that can be communicatively coupled to the service gateway contained in the data plane VCN.

In accordance with an embodiment, untrusted app subnet(s) can include primary VNICs that can be communicatively coupled to tenant virtual machines (VMs) residing within the untrusted app subnet(s). Each tenant VM can run code in a respective container and be communicatively coupled to an app subnet that can be contained in a data plane app tier that can be contained in a container egress VCN 280. Respective secondary VNICs 282 (1)-(N) can facilitate communication between the untrusted app subnet(s) contained in the data plane VCN and the app subnet contained in the container egress VCN. The container egress VCN can include a NAT gateway that can be communicatively coupled to the public Internet.

In accordance with an embodiment, the Internet gateway contained in the control plane VCN and contained in the data plane VCN can be communicatively coupled to a metadata management service that can be communicatively coupled to the public Internet. The public Internet can be communicatively coupled to the NAT gateway contained in the control plane VCN and contained in the data plane VCN. The service gateway contained in the control plane VCN and contained in the data plane VCN can be communicatively coupled to cloud services.

In accordance with an embodiment, the pattern illustrated in FIG. 6 may be considered an exception to the pattern illustrated in FIG. 5 and may be desirable for a customer if the cloud infrastructure provider cannot directly communicate with the customer (e.g., a disconnected region). The respective containers that are contained in the VMs for each customer can be accessed in real-time by the customer. The containers may be configured to make calls to respective secondary VNICs contained in app subnet(s) of the data plane app tier that can be contained in the container egress VCN. The secondary VNICs can transmit the calls to the NAT gateway that may transmit the calls to the public Internet. In this example, the containers that can be accessed in real-time by the customer can be isolated from the control plane VCN and can be isolated from other entities contained in the data plane VCN. The containers may also be isolated from resources from other customers.

In other examples, the customer can use the containers to call cloud services. In this example, the customer may run code in the containers that request a service from cloud services. The containers can transmit this request to the secondary VNICs that can transmit the request to the NAT gateway that can transmit the request to the public Internet. The public Internet can be used to transmit the request to LB subnet(s) contained in the control plane VCN via the Internet gateway. In response to determining that the request is valid, the LB subnet(s) can transmit the request to app subnet(s) that can transmit the request to cloud services via the service gateway.

It should be appreciated that IaaS architectures depicted in the above figures may have other components than those depicted. Further, the embodiments shown in the figures are some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner.

Private Label Cloud Environments

In accordance with an embodiment, a cloud infrastructure environment can be used to provide dedicated cloud environments, for example, as one or more private label cloud environments for use by tenants of the cloud infrastructure environment in accessing subscription-based software products, services, or other offerings associated with the cloud infrastructure environment.

Figure 7:
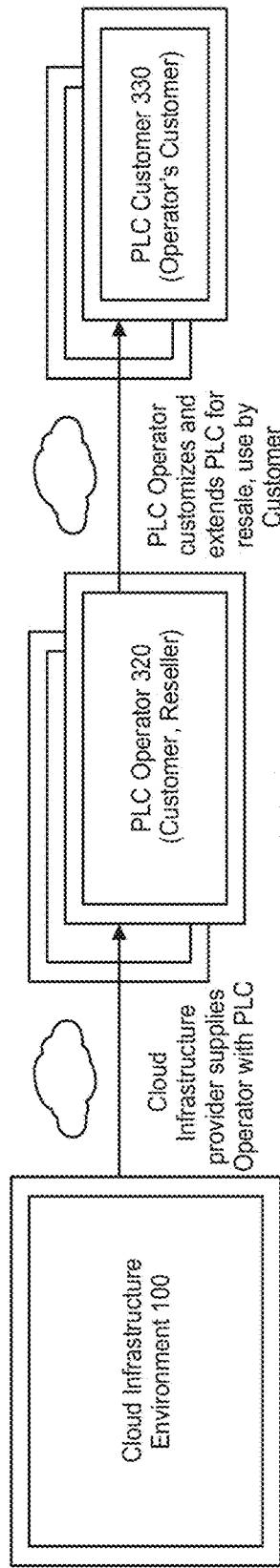
FIG. 7 illustrates how the system can provide dedicated or private label cloud environments for use by tenants or customers of a cloud infrastructure environment in accordance with an embodiment.

FIG. 7 illustrates how the system can provide dedicated or private label cloud environments for use by tenants or customers of a cloud infrastructure environment in accordance with an embodiment.

As illustrated in FIG. 7, in accordance with an embodiment, a cloud infrastructure provider (e.g., OCI) can supply a PLC operator 320, for example an OCI customer operating as a reseller, with one or more private label cloud (PLC) environments. The PLC operator/reseller can then customize and extend the private label cloud for use by (their) customer 330 for use in accessing subscription-based software products, services, or other offerings associated with the cloud infrastructure environment.

For purposes of illustration, examples of such subscription-based products, services, or other offerings may include various Oracle Cloud Infrastructure software products, Oracle Fusion Applications products, or other types of products or services that allow customers to subscribe to usage of those products or services.

Figure 8:
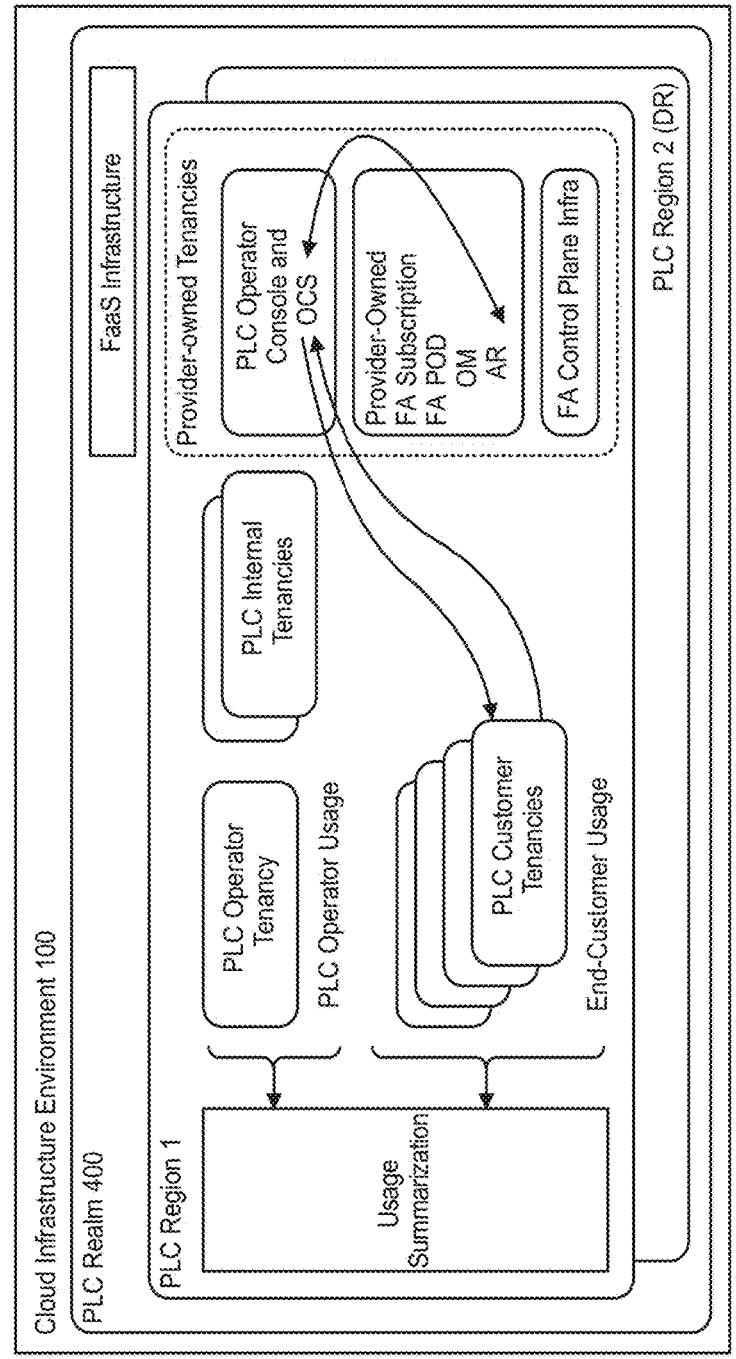
FIG. 8 further illustrates the use of private label cloud realms for use by tenants or customers of a cloud infrastructure environment in accordance with an embodiment.

FIG. 8 further illustrates the use of private label cloud realms for use by tenants or customers of a cloud infrastructure environment in accordance with an embodiment.

As illustrated in FIG. 8, in accordance with an embodiment, the system can include a cloud subscription service or component, such as an Oracle Cloud Subscriptions (OCS) service or component, that exposes one or more subscription management APIs for creating orders used to onboard new customers or to launch a workflow that creates a subscription and orchestrates billing and pricing service or other components for use with a PLC realm 400.

In accordance with an embodiment, when a PLC operator or their customer requests a PLC environment, the system creates a PLC realm for use with one or more provider-owned tenancies. A realm is a logical collection of one or more cloud regions that are isolated from each other and do not allow customer content to traverse realm boundaries to a region outside that realm. Each realm is accessed separately. PLC operators access cloud resources and services through a cloud tenancy. A cloud tenancy is a secure and isolated partition of a cloud infrastructure environment, and it only exists in a single realm. Within this tenancy, operators can access services and deploy workloads across all regions within that realm if policies allow.

In accordance with an embodiment, a first step in the process is to create an operator tenancy for the PLC operator before the realm and associated regions are turned over to them for subsequent management. The PLC operator then becomes the administrator of this tenancy with the ability to view and manage everything that happens within that realm, including their customer accounts and usage by those customers of cloud resources.

Generally, once the realm has been turned over or provided to the PLC operator, the cloud infrastructure provider cannot subsequently access the data within the operator tenancy unless the operator authorizes the cloud infrastructure provider to do so, for example, to provide troubleshooting for issues that may arise.

In accordance with an embodiment, the PLC operator can then create additional internal tenancies, intended for their own use internally, for example, to assess what the end customer experience will be, to provide a sales demo tenancy, or to operate a database for their own internal use. The operator can also create one or more customer tenancies that the end customer will be the administrator for. Cloud infrastructure usage metrics, for example, compute usage, storage usage, and usage of other infrastructure resources, may be consolidated by the operator, reflecting both operator usage and customer usage. Cloud infrastructure usage may be reported to the cloud infrastructure provider.

In accordance with an embodiment, a user interface or console can be provided that allows the PLC operator to manage its customer accounts and customer-offered services. A cloud infrastructure provider can also use a cloud infrastructure tenancy, for example, a Fusion Applications tenancy, to install any needed infrastructure services for use by the operator and their customers.

Figure 9:
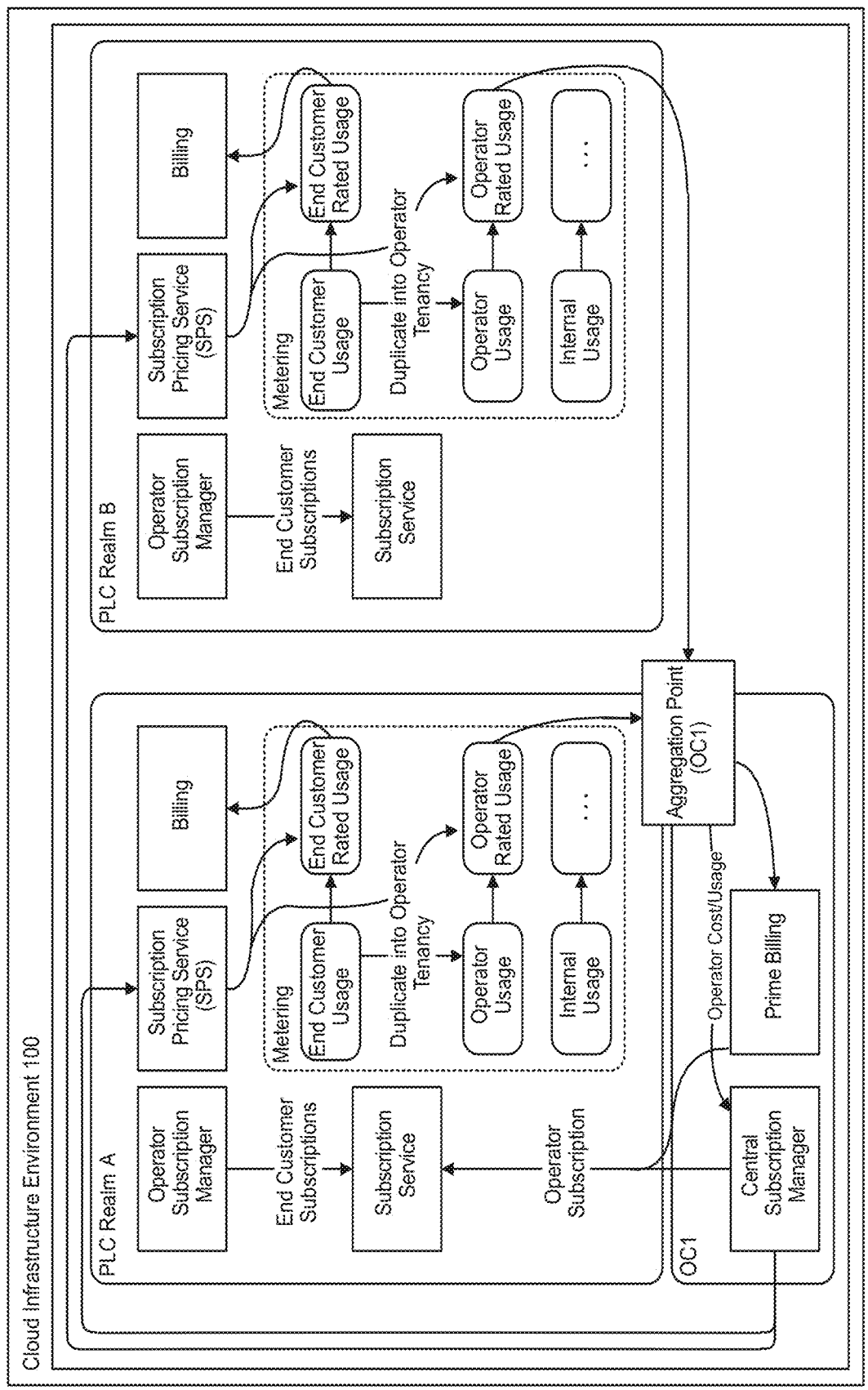
FIG. 9 further illustrates the use of private label cloud realms for use by tenants or customers of a cloud infrastructure environment in accordance with an embodiment.

FIG. 9 further illustrates the use of private label cloud realms for use by tenants or customers of a cloud infrastructure environment in accordance with an embodiment.

As illustrated in FIG. 9, in accordance with an embodiment, a cloud subscription service or component exposes one or more subscription management APIs for creating orders used to onboard new customers or to launch a workflow that creates a subscription and orchestrates billing and pricing services or other components.

In accordance with an embodiment, the system can also include a billing service or component that operates upon a billing account or logical container of subscriptions and preferences used to produce an invoice for a customer.

In accordance with an embodiment, the system can also include a subscription pricing service (SPS) or component that operates upon a product catalog that defines the products that can be purchased by a customer. The subscription pricing service can also be used to provide a price list (e.g., a rate card) that the pricing service also owns.

In accordance with an embodiment, to support the sales process used to create a subscription in a PLC realm, products can be selected from a product hub. Once an order is created, a subscription is created in cloud subscription service that thereafter manages the life cycle of that subscription and provisions what needs to be provisioned in downstream services. The SPS component then manages the aspects of pricing and usage for use in charging the end cost to the PLC operator or their ability to charge their customers. Usage events are forwarded to the billing service or component, where, depending on the billing preferences of the subscription, invoices are created and pushed to an accounts receivables component.

In accordance with an embodiment, although the services that are offered in a realm report their usage to a metering service or component, such usage does not have any price associated with it. A rating process determines how much each specific event costs, for example, by applying rate cards, determines a unit and cost for that subscription, associates the cost to that record, and then forwards that to the billing service or component.

As further illustrated in FIG. 9, in accordance with an embodiment, a PLC operator may control multiple realms A, B. For, example an operator that operates in multiple countries may wish to operate a data center that is completely isolated for the United States of America and a separate data center that is completely isolated for Europe, for example, to address governance or regulatory requirements. In accordance with an embodiment, the usage associated with these multiple realms can be aggregated for use in billing the operator.

The examples of various systems illustrated above are provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

Private Label Cloud Subscriptions

Figure 10:
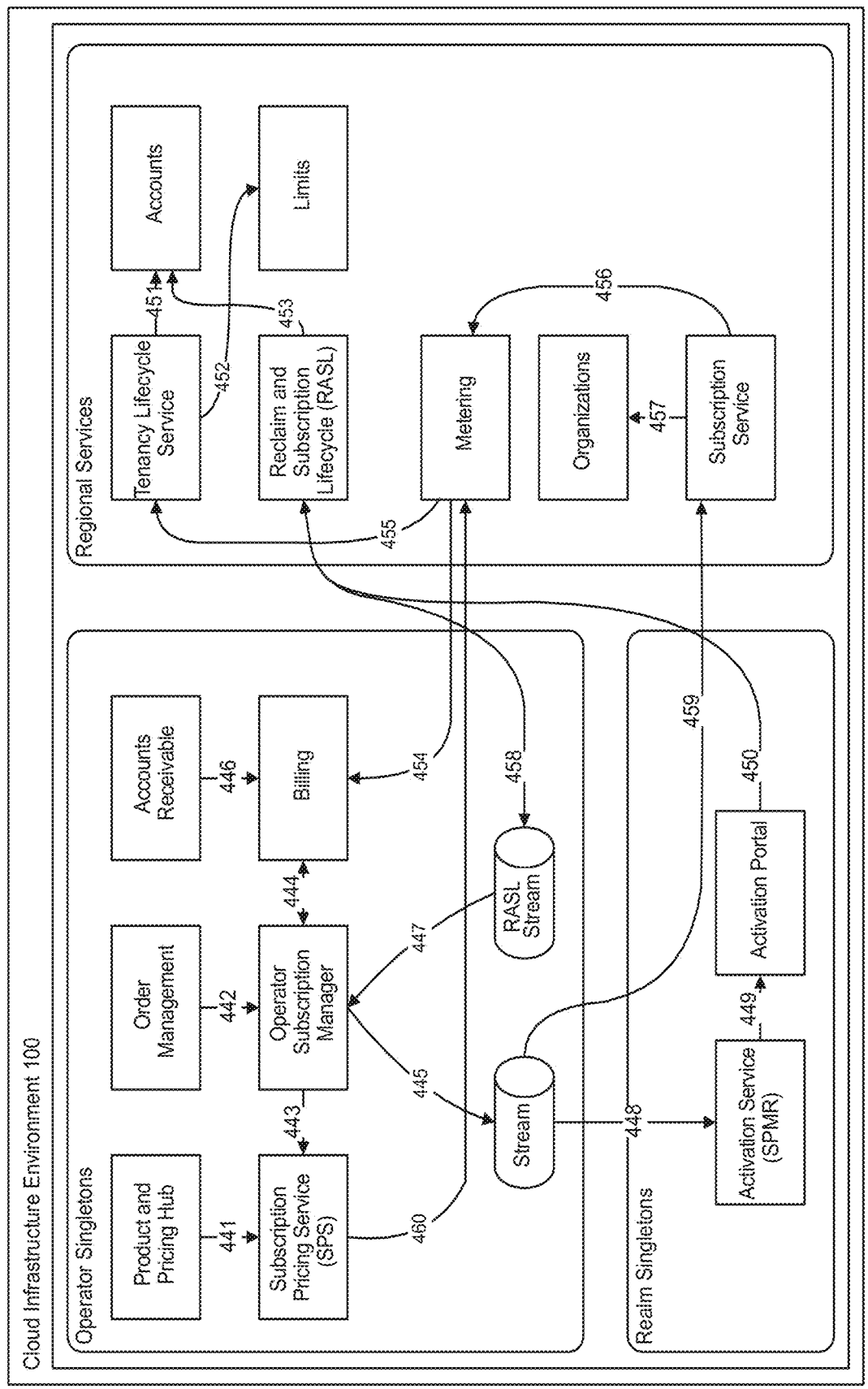
FIG. 10 illustrates a system for providing access to software products or services in a cloud computing or other computing environment in accordance with an embodiment.

FIG. 10 illustrates a system for providing access to software products or services in a cloud computing or other computing environment in accordance with an embodiment.

As illustrated in FIG. 10, in accordance with an embodiment, the system can be provided as a cloud computing or other computing environment, referred to herein in some embodiments as a platform, that supports the use of subscription-based products, services, or other offerings.

Examples of such subscription-based products, services, or other offerings may include various Oracle Cloud Infrastructure (OCI) software products, Oracle Fusion Applications products, or other types of products or services that allow customers to subscribe to usage of those products or services.

In accordance with an embodiment, a subscription can include artifacts, such as products, commits, billing model, and state. The cloud subscription service can expose one or more subscription management APIs for creating orders used to onboard new customers or to launch a workflow that creates a subscription and orchestrates creating the proper footprints in billing and pricing service or components as further described below.

In accordance with an embodiment, the billing service or component operates upon a billing account or logical container of subscriptions and preferences used to produce an invoice. Each billing account generates one or more invoices per billing cycle. The billing service includes a first pipeline that accepts usage and cost from a metering service or component. Usage may be accepted through a REST API or another interface. The billing service writes the usage to a database from which balances may be calculated and aggregated by the billing service or other services. The billing service may include a second pipeline responsible for taking the aggregated usage and commitments and calculating charges over one or more billing intervals.

In accordance with an embodiment, the subscription pricing service (SPS) or component operates upon a product catalog that defines the products that can be purchased by a customer. The product catalog forms the backbone of a price list (i.e., rate card) that the pricing service also owns. Rate cards are modeled as pricing rules on top of public list prices. The pricing service maintains a single price list for each product; new product prices can be added and existing prices changed. The price list has a full history, the latest version being the current rate card. Since some contracts may require a snapshot of the rate card be taken, the pricing service handles this by recording the time a customer's rate card is created and then querying the price list at that time.

In accordance with an embodiment, the SPS or pricing service is responsible for providing information about products, global price lists, and end customer subscription specific price lists and discounts. For example, in accordance with an embodiment, the SPS can sync product information from a product hub (e.g., an Oracle Fusion Product Hub) and a global price list from a pricing hub (e.g., an Oracle Fusion Pricing Hub).

In accordance with an embodiment, the cloud subscription service operates as an upstream service to receive new order requests, for example, from an Oracle Fusion Order Management environment. The cloud subscription service can provide subscription information to the SPS service. Subscription details like time of quote, configuration, and subscription type (Commitment, PayG) help SPS to determine an effective base price (Rate Card) for the subscription. The cloud subscription service can also send discounts for subscriptions received, for example, from Oracle Fusion Order Management, that SPS stores as a pricing rule entity.

In accordance with an embodiment, the SPS service runs as a background process to manage a rate cards service or component responsible for generating rate cards for new subscriptions and updating when new price changes occur. The SPS service can expose APIs to access rate cards and pricing rules. A metering in-line rating engine can utilize these APIs to get subscription-specific rate cards and pricing rules using this data for cost calculations.

In accordance with an embodiment, additional SPS components can include, for example, a Pricing/Product Hub Oracle Integration Cloud (OIC) integration component, that allows a PLC operator entity providing subscription-based products, services, or other offerings within the environment to manage their product and price list, for example, as provided by an Oracle Fusion Product Hub and Oracle Fusion Pricing Hub, respectively.

For example, in accordance with such an embodiment, an SPS OIC product integration flow can listen to create/update events in the Product Hub and make calls to an SPS product API. Similarly, an SPS OIC pricing integration flow can pull new price list creations from the Pricing Hub and call respective SPS pricing APIs.

In accordance with an embodiment, the system can also include an SPS core module that provides APIs to manage and access pricing entities. Pricing can be accessed by internal services, such as an inline rating engine.

In accordance with an embodiment, the system can also include a rate card manager component. The SPS service maintains the single base price for a product at a given time. However, product prices for subscriptions are dependent on a base price at quote configuration time and price list change policy attributes of subscriptions. The SPS service internally maintains the price to be used for subscriptions using these properties. Such price lists are grouped in a rate card. The rate card manager can create and maintain the rate card as well as listen to price list changes and update existing rate cards with the new price. It also listens to new subscriptions and assigns the rate card based on subscription properties.

In accordance with an embodiment, the system can also include a rule decoder engine. The SPS service is responsible for managing pricing rules for a subscription, including discounts offered to an end customer. Pricing rules eligibility can be based on attributes of Products, like Discount group, Product Category, or specific SKUs. Internally, SPS needs to identify the list of products these rules will be applicable. To accomplish this, the rule decoder engine can compile the pricing rules in a format such that an in-line rating engine can consume for cost calculation. This compilation process can be triggered when products or pricing rules get created/updated.

As illustrated by way of example in FIG. 10, in accordance with an embodiment: at 441, a product and price information managed in, e.g., Fusion Applications, is sent to the SPS component. At 442, orders are sent to the cloud subscription service component to create subscriptions, rate cards, and billing accounts. At 443, pricing configuration and pricing rules are sent to SPS for new orders. At 444, the cloud subscription service is used to set up a billing account in the billing service or component. At 445, the cloud subscription service publishes events to a cloud infrastructure streaming component. At 446, charge data is sent to an accounts receivable component to generate invoices. At 447, cloud subscription service consumes reclaim and subscription lifecycle (RASL) events from cloud infrastructure streaming. At 448, an activation service reads the cloud subscription service event stream. At 449, a customer gets activation data from a portal. At 450, a tenancy lifecycle service provisions a tenancy as part of the subscription activation. At 451, the tenancy lifecycle service creates an accounts footprint during account provisioning. At 452, the tenancy lifecycle service sets a limits template during account provisioning. At 453, the accounts component acts as a downstream RASL client to handle legacy reclamation. At 454, aggregated cost and usage is sent to the billing service or component. At 455, an organization can create child tenancies using the tenancy lifecycle service. At 456, a metering service or component gets subscription mapping data. At 457, the subscription service gets organization data for subscription mappings. At 458, RASL reads cloud subscription service event stream. At 459, the subscription service reads cloud subscription service event stream; and at 460, the metering service or component gets a rate card data for each subscription that can then be used in charging the end cost to the PLC operator or their ability to charge their customers.

The above example is provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

2. DEPLOYMENT ORCHESTRATION CLOUD SYSTEM

Figure 11:
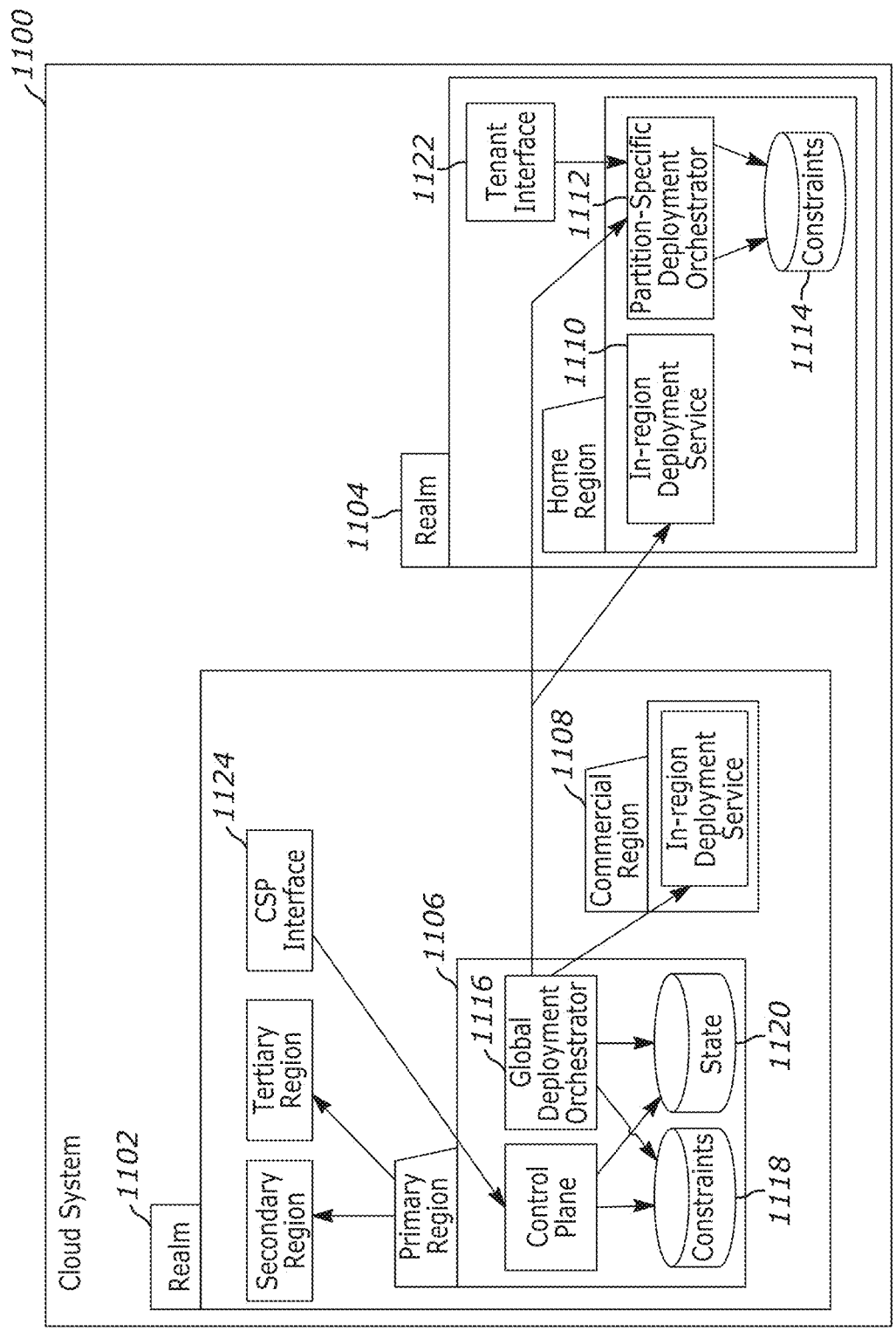
FIG. 11 illustrates a system for controlling deployment of cloud resources in accordance with one or more embodiments.

FIG. 11 illustrates a cloud system 1100 in accordance with one or more embodiments. As illustrated in FIG. 11, the cloud system 1100 includes realm 1102 and realm 1104; each of which is a cloud partition of a cloud environment and a logical grouping of one or more geographic regions. An entity herein referred to as a cloud service provider (CSP) operates the cloud environment in which other entities (e.g., its customers) can host services in their respective partitions. As described herein, the cloud environment may be partitioned into dedicated or PLC environments managed by CSP customers according to one or more embodiments.

In one or more embodiments, the system 100 may include more or fewer components than the components illustrated in FIG. 11. The components illustrated in FIG. 11 may be local to or remote from each other. The components illustrated in FIG. 11 may be implemented in software and/or hardware. The components may be distributed over multiple applications and/or machines. Multiple components may be combined into one application and/or machine. Operations described with respect to one component may instead be performed by another component.

In one or more embodiments, the realm 1102 (that may be referred to as a CSP realm) includes data centers in at least a primary region 1106 and a commercial region 1108. The CSP may use the realm 1102 to manage other realms in the cloud system 1100. The CSP, exercising a level of control over the cloud system 1100, directs the propagation of resource deployments in the realm 1104 but is limited to requesting customer permission to execute those resource deployments. Under certain circumstances, the CSP is allowed to proceed with a resource deployment despite the CSP customer's objection.

Resource deployments generally update/change the set of services available for use by a specific entity or that specific entity's customers. It should be noted that the resource deployments described herein encompass deployments of any type of resource, including storage resources, network resources, and compute resources. Some resources include microservices and cloud services such as application services, network services, storage services, infrastructure services, platform services, and/or the like.

In one or more embodiments, the realm 1104 (that may be referred to as a PLC realm) includes data centers in at least home region 1110. The realm 1104 may be synonymous with a tenancy of the above-mentioned CSP customer (i.e., a tenant-customer). Other embodiments could have greater or fewer additional (e.g., geographically distinct) regions in the realm 1102 and/or the realm 1104. The data centers in the home region 1110 may be configured to run a number of hardware/software components, such as a partition-specific deployment orchestrator 1112, and to store various data such as constraints 1114. Similarly, the data centers in the primary region 1106 of the realm 1102 may be configured to run a number of hardware/software components, such as a global deployment orchestrator 1116, and to store various data, such as constraints 1118 and state 1120.

In general, the partition-specific deployment orchestrator 1112 and the global deployment orchestrator 1116 coordinate the handling of a pending resource deployment. Both are configured to deny or approve the pending resource deployment by evaluating that deployment against the state 1120 of at least part of the cloud system 1110. The denial or approval of any deployment request may be conditioned on evaluating the deployment request against a state of at least part of a particular cloud realm hosted by the cloud system 1100. This evaluation may include the partition-specific deployment orchestrator 1112 and/or the global deployment orchestrator 1116 evaluating the pending resource deployment against their respective deployment constraints in the constraints 1114 and/or the constraints 1118.

In one embodiment, the partition-specific deployment orchestrator 1112 directly invokes a deployment service in the home region 1110 for deploying resources to the realm 1104. In another embodiment, the global deployment orchestrator 1116 directly invokes the same deployment service in the home region 1110 for deploying resources to the realm 1104. Regardless of which component that invokes the deployment service, the CSP is prevented from accessing the constraints 1118 while the tenant-customer retains control over the application of these constraints 1118. Hence, the global deployment orchestrator 1116 may be referred to as a CSP-operated service, and the partition-specific deployment orchestrator 1112 may be referred to as a customer or tenant-operated service. The realm 1102 may be referred to as the CSP realm, and the realm 1104 may be referred to as the tenant realm (or in some cases, PLC realm).

In general, both the constraints 1114 and the constraints 1118 refer to collections of deployment constraints to be placed on any resource deployment to a particular realm such as the realm 1104. A typical resource deployment refers to an installation of new/upgraded versions of one or more software products. One example deployment request may describe, for instance, a service deployment in terms of a version set of microservices for a particular service. A deployment constraint, therefore, can be considered a rule that either the CSP or one of the CSP's customers (hereinafter referred to as tenants) can set to control if/when the resource deployments (simply "deployments") are executed in any realm such as the realm 1104.

The constraints 1114 include any global deployment constraint established by the CSP, and the constraints 1118 include any partition-specific deployment constraint established: by a specific CSP customer having a tenancy in a cloud environment. Similar to how tenant operators (e.g., PLC operators) need to place constraints on deployments to their realms, CSP operators also need to place constraints on those deployments.

Some embodiments of the cloud system 1100 combine the constraints 1114 and/or the constraints 1118 into two-tiered constraints, where the global deployment orchestrator 1116 performs an evaluation of the constraints 1114, and the partition-specific deployment orchestrator 1112 performs a separate evaluation of the constraints 1118. If both evaluations succeed against a pending deployment request for a resource, the partition-specific deployment orchestrator 1112 proceeds to deploy the resource in the realm 1104. In other embodiments, only the constraints 1118 are evaluated.

The following describes various example global deployment constraints according to some embodiments of the constraints 1114. One example global deployment constraint prevents a resource deployment to more than a threshold number (e.g., five) of regions to the CSP realm at a given time. Another example global deployment constraint prevents a resource deployment to a government realm before completing a deployment to a commercial realm. Another example of the global deployment constraints defines at least one logical group of regions and then prevents a deployment to any region not in the at least one logical group while a deployment to the at least one logical group is ongoing. Another example of the global deployment constraints enforces publicly advertised redundancy sets. Another example of the global deployment constraints enforces a rule about starting deployments with less used regions. Another example of the global deployment constraints enforces pre-production deployments to non-publicly available environments. Another example of the global deployment constraints prevent a resource deployment to a PLC realm, such as the realm 1104, until a threshold percentage of a deployment to a CSP realm, such as the realm 1102, is complete. Another example of the global deployment constraints prevents an upgraded cloud environment from being instantiated during a change freeze. This example may be applicable during deployments of new versions of a service across multiple realms of the upgraded cloud environment.

The state 1120 generally refers to a global state and/or partition-specific state, at a certain moment in time, of at least a portion of the cloud environment hosted by the cloud system 1100. The state 1120 may include information describing a set of services that are currently deployed and hosted by a particular cloud partition of the cloud environment, such as the realm 1102 and the realm 1104. The state 1120 includes (recent) state information in the regions in the realm 1102 and the realm 1104. In one embodiment of the state 1120 of the cloud system 1100, the state information includes a state of resource deployments in the realm 1104.

The global deployment orchestrator 1116 may handle the constraints 1118 by evaluating them prior to setting an ordering (e.g., a deployment order) for executing a pending resource deployment. For any given version set of software products, the deployment order is the sequence that a service environment is deployed.

The partition-specific deployment orchestrator 1112 may handle the constraints 1114 by also evaluating them prior to setting the deployment order. In this instance, the constraints 1114 are used to specify intent on behalf of the tenant-customer (or simply, tenant). Evaluating the constraints 1114 can result in a dynamic deployment order for which the CSP's operators do not need to define an ordered graph of service environments ahead of time. Therefore, the deployment order is not determined when deployment of a version set begins; instead, the deployment order is dynamically determined, for example, by continuously evaluating what to do next as the deployment progresses. When a deployment of a version set is ongoing, the global deployment orchestrator 1116 updates state information stored in state 1120 on the progress of the deployment and evaluates what environments should have begun deployment.

In one embodiment, the CSP subjects the partition-specific deployment constraints 1114 to global restrictions. For example, global restrictions prohibit a constraint on one realm that would impede deployments in another realm. In a given realm, a deployment is allowed to proceed if the request satisfies any realm-specific deployment constraints in place.

One or more embodiments may include a snapshot of at least a portion of the cloud system 1100 in a deployment request sent to a disconnected realm. Disconnected realms cannot know about the state of the "global" cloud infrastructure; therefore, disconnected realms cannot make evaluations on constraints based on the state of the (global) cloud system 1100. Evaluations of partition-specific deployment constraints for the disconnected realm may be made based on the snapshot.

Given the Software-defined Networking (SDN) architecture of some embodiments of the cloud system 1100, each region of a realm includes a control plane and a data plane. The partition-specific deployment orchestrator 1112 may include an application and/or a service (e.g., a PLC Valve service) that runs on the data plane and/or the control plane in the home region 1110 and is configured to generate an application programming interface (API) and accessible user interface (UI). A tenant interface 1122 (e.g., a console like the one depicted in FIG. 13) represents one example embodiment of an accessible UI that allows the tenant-operators (e.g., PLC operator) to manage a set of partition-specific deployment constraints for resource deployments in the realm 1104. The PLC operators may use the tenant interface 1122 to maintain and store an up-to-date set of partition-specific deployment constraints in the constraints 1118 by defining new constraints, viewing/removing current constraints, and/or adding pre-defined constraints. Similarly, the CSP operators can use a CSP interface 1124 to maintain and store an up-to-date set of global deployment constraints in the constraints 1114. The CSP operators may further use the CSP interface 1124 to define resource dependencies, safe version ranges/upgrade paths for any resource, and so forth.

The partition-specific deployment orchestrator 1112, running another API in the data plane of the home region 1110, extends the evaluation of the constraints 1118 to the global deployment orchestrator 1116. Hence, via the other API in the data plane, the global deployment orchestrator 1116 communicates with the home region 1110 while the partition-specific deployment orchestrator 1112 obtains and evaluates any deployment request that is transmitted from the realm 1102. In response to a deployment request, the partition-specific deployment orchestrator 1112 determines if the requested deployment can be executed (e.g., immediately); if so, the partition-specific deployment orchestrator 1112 may return a message indicating an approval of the deployment request (e.g., a "YES" response); if not, the partition-specific deployment orchestrator 1112 may return a message indicating a denial (e.g., a "NO" response). In one embodiment, the message may indicate a yes/no response. When an attempt to deploy passes both the global deployment constraints and the partition-specific deployment constraints, the partition-specific deployment orchestrator 1112 returns an approval message, and in turn, the global deployment orchestrator 1116 executes the requested deployment in the realm 1104. For example, the global deployment orchestrator 1116 may communicate a message to an in-region deployment service, prompting the requested deployment to proceed automatically in at least the home region 1110.

In one or more embodiments, a tenant is a corporation, organization, enterprise, or other entity that accesses a shared computing resource, such as application or another cloud resource (e.g., a storage resource, a network resource, and/or the like). A business or operation of one tenant is separate from a business or operation of another tenant. The CSP described herein constitutes an entity. In an embodiment, the tenant managing the realm 1104 is a second entity from the CSP and independent from other tenants of other realms operated by the CSP. In one embodiment, the tenant managing the realm 1104 hosts a tenant-operated cloud environment that is further partitioned amongst at least one third entity. In this manner, the tenant managing the realm 1104 can provide cloud services to its own customers, separate from the CSP.

In one or more embodiments, both the partition-specific deployment orchestrator 1112 and the global deployment orchestrator 1116 refer to hardware and/or software configured to perform operations described herein for enabling tenant-control over resource deployments in the tenant's realm. Examples of operations for the global deployment orchestrator 1116 are described below with reference to FIG. 12.

In an embodiment, the global deployment orchestrator 1116 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, the tenant interface 1122 refers to hardware and/or software configured to facilitate communications between an operator and the global deployment orchestrator 1116. The tenant interface 1122 renders user interface elements and receives input via user interface elements. Examples of interfaces include a graphical user interface (GUI), a command line interface (CLI), a haptic interface, and a voice command interface. Examples of user interface elements include checkboxes, dialog boxes, radio buttons, dropdown lists/menus, list boxes, buttons, toggles, text fields, date and time selectors, command lines, sliders, pages, and forms.

In an embodiment, different components of the tenant interface 1122 are specified in different languages. The behavior of user interface elements is specified in a dynamic programming language such as JavaScript. The content of user interface elements is specified in a markup language such as hypertext markup language (HTML) or XML User Interface Language (XUL). The layout of user interface elements is specified in a style sheet language such as Cascading Style Sheets (CSS). Alternatively, the tenant interface 1122 is specified in one or more other languages, such as Java, C, or C++.

4. CONTROLLING DEPLOYMENT OF CLOUD RESOURCES

Figure 12:
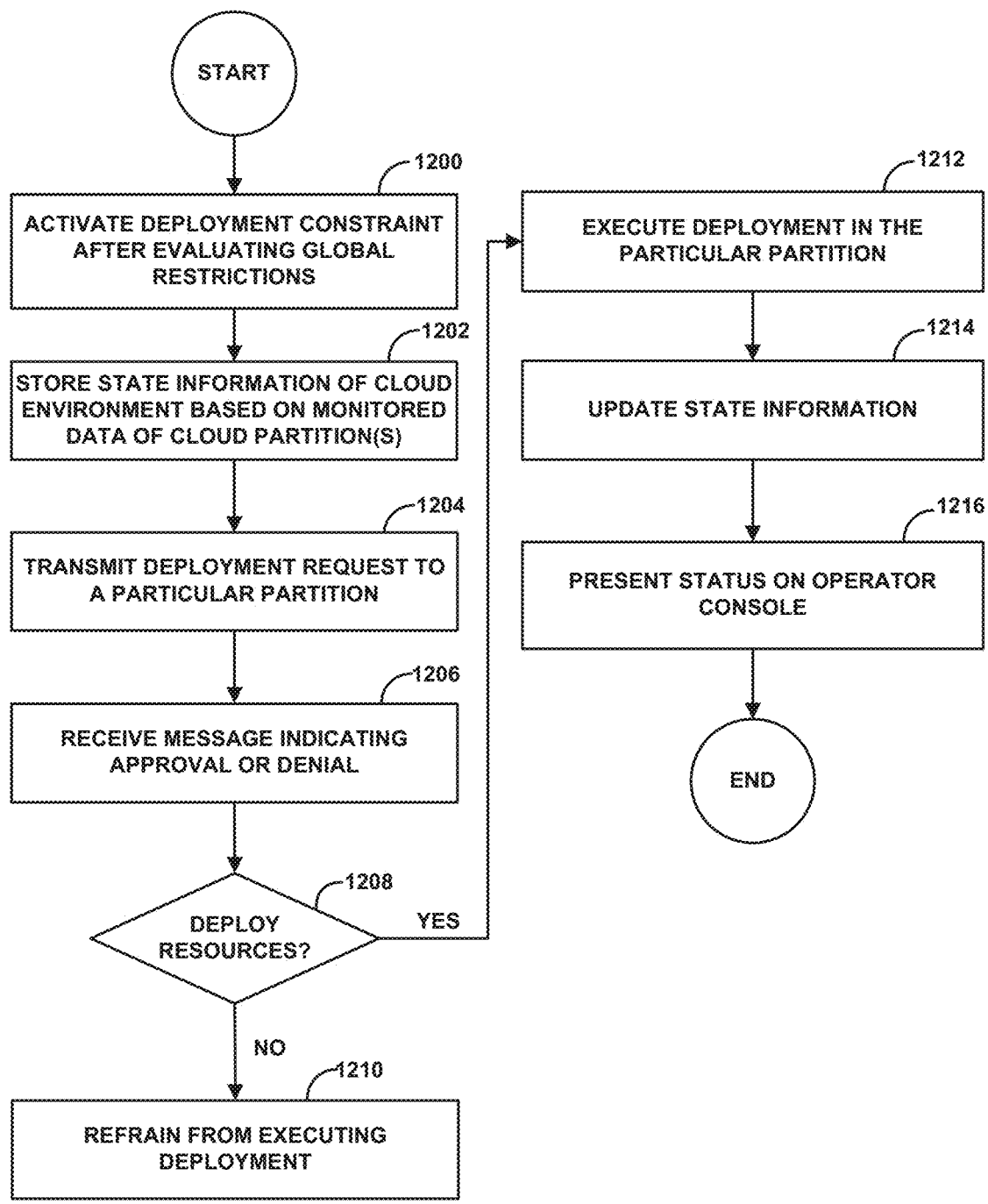
FIG. 12 illustrates an example set of operations for controlling deployment of cloud resources in accordance with one or more embodiments.

FIG. 12 illustrates an example set of operations for a system that controls deployment of resources in a cloud environment in accordance with one or more embodiments. One example implementation of the above system includes a global deployment orchestrator for a cloud system. One or more operations illustrated in FIG. 12 may be modified, rearranged, or omitted all together. Accordingly, the particular sequence of operations illustrated in FIG. 12 should not be construed as limiting the scope of one or more embodiments.

In an embodiment, the system activates deployment constraint after evaluating tenant-global restrictions (Operation 1200). One embodiment of the system includes a global deployment orchestrator configured to evaluate tenant-defined rules (i.e., deployment constraints) against the global restrictions and then activates any authorized rules as partition-specific deployment constraints. The global deployment orchestrator may obtain proposed tenant-defined rules from communications received from a cloud partition (e.g., a realm). The cloud partition's tenant can define attributes of the tenant-selected constraints using a graphical user interface (GUI). A console may present, on the GUI, a library of permissible constraints and selectable attributes for further defining one or more of the permissible constraints.

The above-mentioned global restrictions refer to limitations placed on partition-specific deployment constraints. In one embodiment of the system, a global deployment orchestrator authorizes an example tenant-defined constraint if that constraint satisfies each global restriction. Once satisfaction is determined, the global deployment orchestrator authorizes the tenant-defined constraint for activation. Once activated, the authorized constraint becomes an established partition-specific deployment constraint for a partition-specific deployment orchestrator to use in controlling resource deployments in the cloud partition. On the other hand, responsive to determining that the tenant-selected deployment constraint does not satisfy the global restriction(s) on permissible partition-specific deployment constraints, the partition-specific deployment orchestrator rejects the tenant-defined constraint from being authorized/activated as a partition-specific deployment constraint.

In an embodiment, the system stores state information of the cloud environment based on monitored data associated with one or more cloud partitions (Operation 1202). The monitored data refers to any information describing at least a portion of a state of a particular cloud partition that may be a cloud realm or a specific region within that cloud realm. One example of the monitored data includes version information (e.g., version numbers) for different resources (e.g., software products that are running) in the particular cloud partition. There are a number of hardware/software components configured to collect or detect such information, such as a health service, and maintain an up-to-date state for any cloud partition. The health service described herein may generate and/or receive the monitored data from the particular cloud partition and proceed to update any prior state information for that partition. In one embodiment, the global deployment orchestrator uses the health service for monitoring at least part of the cloud environment, on an ongoing basis, to determine the state of the cloud environment.

In some embodiments, the system uses the state information to prepare a deployment request for transmission to at least one cloud partition. In one embodiment of the system, a global deployment orchestrator generates the deployment request to indicate the resources that are to be deployed and their version information based on the monitored data. An example deployment request includes example monitored data indicating version information for a software product being upgraded/changed or otherwise deployed in the cloud partition. Another example deployment request includes a snapshot of the same software product(s), as deployed, in a reference cloud partition (e.g., the CSP realm). In this manner, the global deployment orchestrator can provide the partition-specific deployment orchestrator with accurate deployment plans and elicit an immediate (i.e., dynamic) evaluation against partition-specific state information and/or one or more partition-specific deployment constraints. In one or more embodiments, the system is limited to including a version set in the deployment request and therefore, does not use any other state information to prepare the deployment request.

In an embodiment, the system transmits the deployment request to one or multiple cloud partition(s) (Operation 1204). One embodiment of the system evaluates global deployment constraints against a pending deployment and after determining that the deployment satisfies the global deployment constraints, transmits the deployment request to a cloud partition. Therefore, before transmitting the deployment request, the system confirms satisfaction of the global deployment constraints. In one embodiment, the system runs an automated process for deployment request transmissions amongst the cloud partitions in the cloud environment. These global deployment constraints may include time and date constraints, dependency constraints, minimum version constraints, and any other conceivable rule to be evaluated before transmitting the deployment request. A number of example global deployment constraints are described herein for FIG. 11.

In another embodiment, the system transmits the same deployment request to a first cloud partition and a second cloud partition where both are associated with a same tenant or with different tenants. In this manner, the system can deploy the same resource (or same resource version) to both the first cloud partition and the second cloud partition, depending on the respective states of the first cloud partition and the second cloud partition. In one example, the system can deploy the resource in the first cloud partition but refrain from such deployment to the second cloud partition, and vice versa. In another example, the system can transmit, to each cloud partition, separate deployment requests for different versions of the same resource. The partition-specific deployment orchestrator in each cloud partition may evaluate the deployment request using partition-specific state information obtained from an in-partition data store.

In an embodiment, the system receives a message indicating approval or denial of a pending deployment request (Operation 1206). In one embodiment, the partition-specific deployment orchestrator in the cloud partition generates and then transmits such a message after evaluating the deployment request against a state of the cloud environment and then, approving the deployment of a first resource based on a set of partition-specific deployment constraints. Similar to the global deployment constraints, the partition-specific deployment constraints may include time and date constraints, dependency constraints, minimum version constraints, and any other conceivable rule to be evaluated prior to approving the deployment request. The partition-specific deployment orchestrator in the cloud partition may perform the evaluation by determining if the first deployment request satisfies at least one partition-specific deployment constraint associated with the cloud partition. In one embodiment, the partition-specific deployment orchestrator denies any deployment request that fails to satisfy the set of partition-specific deployment constraints by returning a message indicating such a denial.

In one embodiment for evaluating a minimum version constraint, the state of the cloud environment includes a version number of a second resource that is deployed in the cloud partition; evaluating the deployment request includes determining that the version number of the second resource satisfies a minimum version requirement. In one embodiment, the first resource is dependent on the second resource.

In another embodiment of the minimum version constraint, the state of the cloud environment includes a current version number of a resource already deployed in a cloud partition; evaluating the deployment request against the state of the cloud environment includes determining whether the target version number differs from the current version number by less than a threshold value. In one embodiment, the partition-specific deployment orchestrator approves such a deployment request for the target version number if (and only if) the difference between a current version of the resource and a target version of the resource is less than a threshold value.

In one embodiment, the state of the cloud environment includes a state of resource deployments in a second cloud partition (e.g., a reference cloud partition) of the plurality of cloud partition. The system performs an operation including evaluating the deployment request for the first resource against the state of the cloud environment, that further includes determining that the first resource has already been deployed to the second cloud partition. One example of the second cloud partition is illustrated in FIG. 11 as the realm 1102 (i.e., a commercial realm). In one embodiment, the partition-specific deployment orchestrator prepares the deployment request to include the state of resource deployments in a second cloud partition of the plurality of cloud partitions. The state of resource deployments in the second cloud partition may be herein referred to as a snapshot.

In an embodiment, the system performs a determination regarding whether or not to deploy the deployment request (Operation 1208). In one embodiment, based on receiving a message indicating approval or denial of the deployment request, the system determines if it should execute a deployment outlined in the deployment request or refrain from executing the deployment. The system can execute the deployment in response to an approval by the partition-specific deployment orchestrator. Under certain circumstances, the system can also execute the deployment in response to a denial by the partition-specific deployment orchestrator, for example, when one or more override conditions are present. While the system can determine to execute the deployment in response to an approval or a denial by the partition-specific deployment orchestrator, conversely, the system can also refrain from executing the deployment in response to an approval or a denial by the partition-specific deployment orchestrator as explained below. There may be a number of reasons for the system to override a denial indicated in the received message.

In an embodiment, the system refrains from executing the deployment outlined in the deployment request (Operation 1210). In one embodiment, the system determines to refrain from executing a deployment of a resource in a cloud partition based upon receiving a message indicating a denial of the deployment request. The system can halt a pending transmission of an automated deployment if such a message is detected. There are a number of ways, as explained below, for the system to execute the above deployment even after the denial.

The system can reattempt a deployment of a resource in a cloud partition even after an initial failure of a first deployment request (to satisfy a set of partition-specific deployment constraints associated with the cloud partition). An embodiment of the global deployment orchestrator transmits a second deployment request to deploy the resource to the cloud partition subsequent to refraining from deploying the resource to the cloud partition after a denial of the first deployment request. Responsive to receiving, from the cloud partition, a message indicating approval of the second deployment request, the global deployment orchestrator executes the deployment by deploying the resource to the cloud partition.

The system can override a denial of a deployment request (for failing to satisfy a set of partition-specific deployment constraints associated with a cloud partition) and proceed with a resource deployment to the cloud partition. An embodiment of the global deployment orchestrator executes the resource deployment after determining that the deployment request is associated with a constraint-override condition. An example constraint-override condition may permit deploying the resource to the cloud partition at a time that would otherwise be prohibited by the set of partition-specific deployment constraints. Another example constraint-override condition may permit emergency deployments that would otherwise be prohibited by the partition-specific deployment constraint.

In one embodiment, the global deployment orchestrator transmits a deployment request indicating an emergency deployment (e.g., emergency updates including critical patches), and in turn, the partition-specific deployment orchestrator executes the emergency deployment without any evaluation (e.g., against partition-specific deployment constraints). The emergency deployment may contain a minimum update where changes are restricted to those necessary to resolve an emergency with respect to a recent (e.g., latest) deployment in the CSP realm. In another embodiment, the emergency deployment includes at least one update between a current version and a new version of a resource.

In an embodiment, the system executes, in the cloud partition, the deployment outlined in the deployment request (Operation 1212). In one embodiment, the system transmits deployment instructions to an in-partition-specific deployment service (e.g., an in-realm or in-region deployment service) where those instructions direct the execution of the deployment.

After the deployment, the system updates any state information for the cloud partition (Operation 1214). In an embodiment, the system presents a status of the deployment on an operator console (Operation 1216). Assuming the deployment successfully installed in the cloud partition, the system can present a status indicating a successful deployment of one or more upgrades/changes to software products running in the cloud partition.

5. EXAMPLE EMBODIMENT

A detailed example is described below for purposes of clarity. Components and/or operations described below should be understood as one specific example which may not be applicable to certain embodiments. Accordingly, components and/or operations described below should not be construed as limiting the scope of any of the claims.

Figure 13:
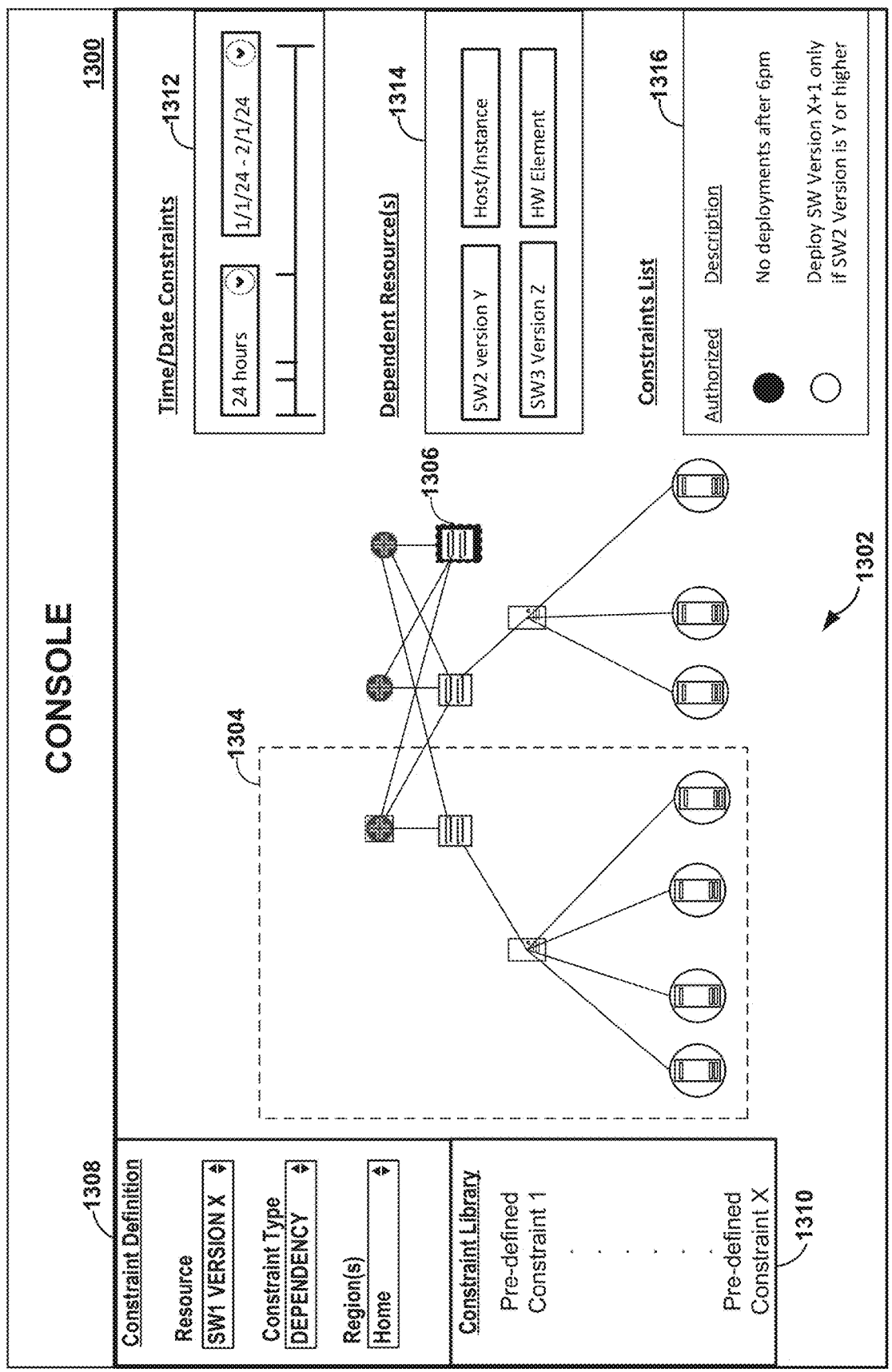
FIG. 13 illustrates an example embodiment of a graphical user interface (GUI) for a cloud environment.

FIG. 13 illustrates an example embodiment of an operator interface to a partition-specific deployment orchestrator. The operator interface depicted in FIG. 13 is represented by console 1300. The partition-specific deployment orchestrator, which is configured to facilitate tenant control over deployments of cloud resources in a particular cloud partition of cloud environment 1302, can generate a graphical user interface (GUI) for the console 1300.

Various embodiments of the console 1300 present content including various information and/or UI controls. Some examples of the UI controls enable definitions of rules that control the changes/updates that can be made to one or more specific cloud partitions. These rules are partition-specific deployment constraints for use in evaluating deployment requests from an entity operating the cloud environment 1302. Some examples of the various information describe the partition-specific deployment constraints.

In particular, the console 1300 presents various information and/or UI controls corresponding to the cloud environment 1302, depicted in FIG. 13 as a network (e.g., a SDN-based network). As described herein, the cloud environment 1302 includes multiple data centers, in different geographical regions, connected to each other via networking elements. The cloud environment 1302 may be partitioned into a number of realms, such as realm 1304, where a realm includes a logical grouping of data centers across multiple geographic regions. The cloud environment 1302 forms a network hierarchy where a plurality of end user devices is at a lowest level.

As described herein, a CSP may operate the cloud environment 1302 whose customers have tenancies and can use the console 1300 to specify constraints on the deployments to their respective cloud partitions (e.g., realms). It should be noted that these constraints can apply to both the realm 1304 and multiple realms. The CSP may run services, including a global deployment orchestrator 1306, in a CSP realm of the cloud environment 1302. The global deployment orchestrator 1306 transmits a deployment request to the realm 1304, and upon receiving that deployment request, the partition-specific deployment orchestrator for the realm 1304 automatically evaluates the partition-specific deployment constraints applicable to that realm 1304.

One of the CSP's tenants may be allocated the realm 1304 to manage and/or run as its own partition of the cloud environment 1302. In one embodiment, the tenant may host its own (guest) cloud environment on that partition. As such, an operator for the tenant may use the console 1300 to define candidates for the partition-specific deployment constraints. These candidates are subject to global restrictions before the global deployment orchestrator 1306 can activate any candidate for application to the realm 1304. The operator for the tenant can activate a control 1308 (depicted in FIG. 13 with a label of "Constraint Definition") to define a candidate deployment constraint by one or more attributes: resource name, constraint type, and/or region(s). The resource name identifies the cloud resource(s) (e.g., software product(s)) that the operator desires to control via a deployment constraint being deployed and or upgraded. If the same resource is the subject of a deployment request, the partition-specific deployment orchestrator applies any deployment constraint with that resource name. The constraint type refers to a deployment constraint category that the operator may select to define a candidate deployment constraint. Example categories for such a candidate may include a dependency constraint, time/date constraint, a minimum version requirement constraint, and or the like. The region(s) attribute specifies one or more geographic regions where the deployment constraint is applicable. FIG. 13 depicts a selected geographic region in the realm 1304 by using shading to differentiate the selected geographic region from other regions. The control 1308 further includes drop down menus for selecting an appropriate value for an attribute.

The operator for the tenant may use control 1310 (which is labelled "constraint library" in FIG. 13) to select one or more pre-defined constraints for activation as one or more partition-specific deployment constraints. A pre-defined constraint is a permissible partition-specific deployment constraint for application to future resource deployments in the realm 1304. The control 1310 may present a curated and supported set of permissible partition-specific deployment constraints that the operator for the tenant can select. The global deployment orchestrator 1306 evaluates the operator's selected partition-specific deployment constraint(s) in view of the global restrictions set forth by the CSP; if an operator-selected constraint satisfies the global restrictions, the global deployment orchestrator 1306 activates that operator-selected constraint for application to the realm 1304. Otherwise, the global deployment orchestrator 1306 rejects a selected constraint for failing to satisfy all the global restrictions.

Some example constraints can restrict resource deployments to only one region in the realm 1304 at a given time and/or when there are at least two days between subsequent deployments or between one region's deployment and another region's deployment. Another example can restrict deployments so each starts and finishes within a deployment window (e.g., between 9 PM and 6 AM or on weekends). Another example can constrain deployments to certain resource types (e.g., services such as a compute service) and/or specific versions of a resource. Another example can hold a deployment until after a successful deployment to the CSP realm has finished and/or a number of days has passed. Another example can hold a deployment for a number of days after publication. Another example can deploy a resource only if consent has been granted for that resource or a timeout of three days is reached. Another example can allow for change freezes, such as between January $3^{rd}$ and January $12^{th}$. The supported library of constraints may evolve over time.

Regardless of whether or not the operator selects a permissible partition-specific deployment constraint from the constraint library in the control 1310 or defines a permissible partition-specific deployment constraint using the control 1308, a deployment constraint is subject to global restrictions. The console 1300, with support from the partition-specific deployment orchestrator, enforces the global restrictions by rejecting any candidate constraint in violation. Some example global restrictions prevent one partition from impeding the deployments in another partition. One example restriction calls for the rejection of any candidate constraining a deployment in the realm 1304 until after a deployment in another realm (except for the CSP realm) or every other realm in the cloud environment 1302. Some example restrictions require rejection when the candidate constrains a deployment to a limited deployment window (e.g., deploy to my realm on the first Saturday of a month or deploy data planes to my realm on the weekend). Infrequent deployments can cause the realm 1304 to operate improperly.

As described herein, one example constraint type is a time and date constraint that limits one or more of a time, a duration, or a frequency of deployments permitted in a cloud partition. One example time and date constraint refers to a specific time period in which a resource deployment is (or is not) permitted (i.e., a deployment window). The time and date constraint is a partition-specific deployment constraint that limits one or more of a time, a duration, or a frequency of deployments permitted in the first cloud partition. The operator for the tenant may use control 1312 (labelled "Time and Date constraints" in FIG. 13) to set a time and date constraint for any future resource deployment.

As described herein, another example constraint type is the dependency constraint, that refers to a resource dependency between a first resource and at least one second (dependent) resource. The operator for the tenant may use control 1314 to set one or more dependent resources for a constraint definition. In one embodiment, an operator of the CSP defines dependencies between resources for the operator of the tenant to select as the dependent resource(s) for the constraint definition. The operator of the CSP can also define ranges of versions applicable to the dependent resource(s).

Another example constraint type is the minimum version requirement constraint, which refers to setting a minimum version requirement and/or a difference threshold between a current version and a proposed target version of a resource to be deployed in the realm 1304. In one embodiment, an operator of the CSP can set ranges of safe versions and/or a safe upgrade path for any resource and/or any dependent resource for that resource. In this manner, the operator of the tenant can use the control 1308 to set the minimum version requirement constraint and the control 1314 to set the dependency constraint in a combined deployment constraint definition.

The console 1300 includes a number of informational dialog boxes including control 1316 (which is labelled "Constraints List" in FIG. 13). The control 1316 may be configured to enumerate both candidate and activated deployment constraints for the realm 1304. The control 1316 may be further configured to identify the constraints that have been authorized by the global deployment orchestrator 1306.

6. MISCELLANEOUS; EXTENSIONS

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in Patent Applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method, comprising:
determining, by a global deployment orchestrator for a cloud environment comprising a plurality of cloud partitions of the cloud environment, that a first deployment request to deploy a first resource satisfies one or more global deployment constraints applicable to the plurality of cloud partitions, wherein the first deployment request comprises state information associated with the cloud environment;
transmitting the first deployment request to (a) a first partition in the plurality of cloud partitions and (b) a second partition in the plurality of cloud partitions;
receiving, from the first partition, a message indicating approval of the first deployment request for the first partition;
responsive to receiving the message indicating approval of the first deployment request for the first partition: deploying the first resource in the first partition;
receiving, from the second partition, a message indicating denial of the first deployment request for the second partition;
responsive to receiving the message indicating denial of the first deployment request for the second partition: refraining from deploying the first resource in the second partition;
wherein approval of the first deployment request for the first partition and denial of the first deployment request for the second partition are based at least in part on respective partition-specific evaluations of the state information associated with the cloud environment;
wherein the method is performed by at least one device including a hardware processor.

2. The method of claim 1, wherein the state information comprises state information associated with a third partition in the plurality of cloud partitions.

3. The method of claim 1, further comprising:
monitoring, on an ongoing basis, the cloud environment to obtain the state information associated with the cloud environment.

4. The method of claim 1:
wherein approval of the first deployment request for the first partition is further conditioned on evaluation of a first partition-specific deployment constraint associated with the first partition;
wherein denial of the first deployment request for the second partition is further conditioned on evaluation of a second partition-specific deployment constraint associated with the second partition.

5. The method of claim 4, further comprising:
receiving first user input, from a customer operator of the first partition, that defines the first partition-specific deployment constraint.

6. The method of claim 5, wherein the first user input comprises a selection of the first partition-specific deployment constraint from a library of permissible partition-specific deployment constraints.

7. The method of claim 5, further comprising:
responsive to receiving the first user input: determining that the first partition-specific deployment constraint satisfies a global restriction on permissible partition-specific deployment constraints.

8. The method of claim 5, further comprising:
receiving second user input that defines a third partition-specific deployment constraint;
responsive to receiving the second user input: determining that the third partition-specific deployment constraint does not satisfy a global restriction on permissible partition-specific deployment constraints; and
responsive to determining that the third partition-specific deployment constraint does not satisfy the global restriction on permissible partition-specific deployment constraints: rejecting the third partition-specific deployment constraint.

9. The method of claim 1, further comprising:
subsequent to refraining from deploying the first resource to the second partition: transmitting, to the second partition, a second deployment request to deploy the first resource to the second partition;
receiving, from the second partition, a message indicating approval of the second deployment request;
responsive to receiving the message indicating approval of the second deployment request: deploying the first resource to the second partition.

10. The method of claim 1, further comprising:
determining that a third deployment request, to deploy a second resource to a third partition in the plurality of cloud partitions, is associated with a constraint-override condition;
responsive to determining that the third deployment request is associated with the constraint-override condition: deploying the second resource to the third partition, even though the third deployment request does not satisfy a partition-specific deployment constraint associated with the third partition.

11. The method of claim 10, wherein the constraint-override condition permits deploying the second resource to the third partition at a time that would otherwise be prohibited by the partition-specific deployment constraint.

12. The method of claim 10, wherein the constraint-override condition permits emergency deployments that would otherwise be prohibited by the partition-specific deployment constraint.

13. The method of claim 1:
wherein determining that the first deployment request satisfies the one or more global deployment constraints is performed by the global deployment orchestrator for the plurality of cloud partitions;
wherein approval of the first deployment request for the first partition is determined by a first partition-specific deployment orchestrator associated with the first partition;
wherein denial of the first deployment request for the second partition is determined by a second partition-specific deployment orchestrator associated with the second partition.

14. The method of claim 1, wherein the plurality of cloud partitions comprises a plurality of geographically distinct regions of the cloud environment.

15. The method of claim 1, wherein the first partition comprises a logical grouping of a plurality of geographically distinct regions of the cloud environment.

16. The method of claim 1:
wherein the cloud environment is operated by a cloud service provider (CSP);
wherein the first partition is operated, at least in part, by a second entity that is different from the CSP.

17. The method of claim 16, wherein the second entity provides access to the first partition to a third entity that is different from both the CSP and the second entity.

18. One or more non-transitory computer-readable media storing instructions which, when executed by one or more hardware processors, cause performance of operations comprising:

determining, by a global deployment orchestrator for a cloud environment comprising a plurality of cloud partitions of the cloud environment, that a first deployment request to deploy a first resource satisfies one or more global deployment constraints applicable to the plurality of cloud partitions, wherein the first deployment request comprises state information associated with the cloud environment;

transmitting the first deployment request to (a) a first partition in the plurality of cloud partitions and (b) a second partition in the plurality of cloud partitions;

receiving, from the first partition, a message indicating approval of the first deployment request for the first partition;

responsive to receiving the message indicating approval of the first deployment request for the first partition: deploying the first resource in the first partition;

receiving, from the second partition, a message indicating denial of the first deployment request for the second partition;

responsive to receiving the message indicating denial of the first deployment request for the second partition: refraining from deploying the first resource in the second partition;

wherein approval of the first deployment request for the first partition and denial of the first deployment request for the second partition are based at least in part on respective partition-specific evaluations of the state information associated with the cloud environment.

19. A system comprising:

at least one device including a hardware processor; and
the system being configured to perform operations comprising:

determining, by a global deployment orchestrator for a cloud environment comprising a plurality of cloud partitions of the cloud environment, that a first deployment request to deploy a first resource satisfies one or more global deployment constraints applicable to the plurality of cloud partitions, wherein the first deployment request comprises state information associated with the cloud environment;

transmitting the first deployment request to (a) a first partition in the plurality of cloud partitions and (b) a second partition in the plurality of cloud partitions;

receiving, from the first partition, a message indicating approval of the first deployment request for the first partition;

responsive to receiving the message indicating approval of the first deployment request for the first partition: deploying the first resource in the first partition;

receiving, from the second partition, a message indicating denial of the first deployment request for the second partition;

responsive to receiving the message indicating denial of the first deployment request for the second partition: refraining from deploying the first resource in the second partition;

wherein approval of the first deployment request for the first partition and denial of the first deployment request for the second partition are based at least in part on respective partition-specific evaluations of the state information associated with the cloud environment.

* * * * *